United States Patent
Peng et al.

(10) Patent No.: US 10,548,074 B2
(45) Date of Patent: Jan. 28, 2020

(54) RULE-BASED ROUTING WITHIN A SOFTWARE-DEFINED CORE NETWORK

(71) Applicant: Huawei Technologies Co., Ltd., Shenzhen (CN)

(72) Inventors: Chenghui Peng, Munich (DE); Wei Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 349 days.

(21) Appl. No.: 15/223,360

(22) Filed: Jul. 29, 2016

(65) Prior Publication Data

US 2016/0337962 A1 Nov. 17, 2016

Related U.S. Application Data

(63) Continuation of application No. PCT/CN2014/071829, filed on Jan. 29, 2014.

(51) Int. Cl.
| | |
|---|---|
| *H04W 48/20* | (2009.01) |
| *H04L 12/64* | (2006.01) |
| *H04L 12/26* | (2006.01) |
| *H04W 72/04* | (2009.01) |
| *H04L 12/24* | (2006.01) |
| *H04W 88/02* | (2009.01) |
| *H04W 88/12* | (2009.01) |
| *H04W 88/16* | (2009.01) |

(52) U.S. Cl.
CPC ......... *H04W 48/20* (2013.01); *H04L 12/6418* (2013.01); *H04L 41/0806* (2013.01); *H04L 43/028* (2013.01); *H04W 72/042* (2013.01); *H04W 88/02* (2013.01); *H04W 88/12* (2013.01); *H04W 88/16* (2013.01)

(58) Field of Classification Search
CPC ...................................................... H04W 48/20
See application file for complete search history.

(56) References Cited

U.S. PATENT DOCUMENTS

| | | | |
|---|---|---|---|
| 9,450,817 B1 * | 9/2016 | Bahadur | ................. H04L 45/64 |
| 2003/0126246 A1 | 7/2003 | Blouin et al. | |

(Continued)

FOREIGN PATENT DOCUMENTS

| | | | | | |
|---|---|---|---|---|---|
| CN | 103051539 A | | 4/2013 | | |
| CN | 103051629 A | * | 4/2013 | ......... | H04L 67/2814 |

(Continued)

*Primary Examiner* — Jason E Mattis
(74) *Attorney, Agent, or Firm* — Slater Matsil, LLP

(57) ABSTRACT

Embodiments of the present invention provide a data transmission method, a transmission control method, and a device. An SDN includes: a network controller, a first edge node, and at least one second edge node, where the network controller provides a target routing rule for the first edge node, the first edge node receives a data packet that needs to be transmitted, determines a target edge node, acquires the target routing rule from the network controller according to the target edge node, and sends the data packet to the target edge node according to the target routing rule; and when used as the target edge node, the at least one second edge node receives the data packet sent by the first edge node, and complete transmission of the data packet. The technical solutions in the present invention can improve communication efficiency of the SDN.

20 Claims, 11 Drawing Sheets

(56) References Cited

U.S. PATENT DOCUMENTS

| | | | |
|---|---|---|---|
| 2011/0320622 A1* | 12/2011 | Cutler | H04L 12/14 709/230 |
| 2012/0303835 A1* | 11/2012 | Kempf | H04W 24/02 709/235 |
| 2013/0223226 A1 | 8/2013 | Narayanan et al. | |
| 2013/0223442 A1 | 8/2013 | Narayanan et al. | |
| 2013/0266007 A1 | 10/2013 | Kumbhare et al. | |
| 2013/0329601 A1 | 12/2013 | Yin et al. | |
| 2014/0155088 A1* | 6/2014 | Yang | H04W 64/00 455/456.1 |
| 2014/0177634 A1* | 6/2014 | Jiang | H04L 45/64 370/392 |
| 2015/0103743 A1* | 4/2015 | Tamura | H04W 40/02 370/328 |
| 2015/0280927 A1* | 10/2015 | Liang | H04L 45/38 370/259 |
| 2015/0372905 A1 | 12/2015 | Hu | |

FOREIGN PATENT DOCUMENTS

| | | |
|---|---|---|
| CN | 103051629 A | 4/2013 |
| CN | 103095565 A | 5/2013 |
| EP | 2765751 A1 | 8/2014 |

\* cited by examiner

RULE-BASED ROUTING WITHIN A SOFTWARE-DEFINED CORE NETWORK

CROSS-REFERENCE TO RELATED APPLICATIONS

This application is a continuation of International Application No. PCT/CN2014/071829, filed on Jan. 29, 2014, which is hereby incorporated by reference in its entirety.

TECHNICAL FIELD

Embodiments of the present invention relate to communications technologies, and in particular, to a data transmission method, a transmission control method, and a device.

BACKGROUND

A software-defined network (SDN for short) is an innovative network architecture, which aims to implement network programmability and provide a good platform for innovation of a network and an application. An essence of the software-defined network is to separate network control from a physical device, and form a control hub by means of integration; therefore, the physical device has only a policy execution function and a simple data forwarding function. A current SDN solution is separating out a control plane of function network elements in the network, mainly including devices such as a switch and a router, using the control plane as a user plane device for implementation, and deploying a separated control plane device, that is, a network controller.

Centralized control is an advantage of the SDN, but also brings a problem and a challenge. If the user plane device constantly requires a decision of the network controller, a large amount of signaling is generated between the user plane device and the network controller, and a large quantity of signaling overheads greatly reduce communication efficiency of the entire network.

SUMMARY

Embodiments of the present invention provide a data transmission method, a transmission control method, and a device, to improve communication efficiency of an SDN.

A first aspect provides a software-defined network SDN including a network controller, a first edge node, and at least one second edge node. The first edge node is configured to receive a data packet that needs to be transmitted, determine a target edge node, acquire a target routing rule from the network controller according to the target edge node, and send the data packet to the target edge node according to the target routing rule, so that the target edge node completes transmission of the data packet. The target edge node refers to a second edge node that the data packet needs to pass through in a process of transmitting the data packet. The target routing rule refers to a rule of routing between the first edge node and the target edge node. The at least one second edge node is configured to receive the data packet sent by the first edge node according to the target routing rule, and complete transmission of the data packet while being used as the target edge node. The network controller is configured to provide the target routing rule for the first edge node.

A second aspect provides a network device, located in a software-defined network SDN, where the network device is a first edge node and specifically includes a receiving module configured to receive a data packet that needs to be transmitted. A determining module is configured to determine a target edge node. The target edge node refers to a second edge node that is in the SDN and that the data packet needs to pass through in a process of transmitting the data packet. A routing rule module is configured to acquire a target routing rule from a network controller in the SDN according to the target edge node, where the target routing rule refers to a rule of routing between the first edge node and the target edge node. A sending module is configured to send the data packet to the target edge node according to the target routing rule, so that the target edge node completes transmission of the data packet.

A third aspect provides a network controller, located in a software-defined network SDN, where the network controller includes: a routing rule module, configured to configure routing information for a first edge node in the SDN, where the routing information includes a rule of routing from the first edge node to each second edge node in the SDN; and a sending module, configured to send the routing information to the first edge node, so that the first edge node determines, based on the routing information when receiving a data packet that needs to be transmitted, a target rule of routing to a target edge node, where the target edge node is a second edge node that the data packet needs to pass through in a process of transmitting the data packet.

A fourth aspect provides a data transmission method, including: receiving, by a first edge node in a software-defined network SDN, a data packet that needs to be transmitted; determining, by the first edge node, a target edge node, where the target edge node refers to a second edge node that the data packet needs to pass through in a process of transmitting the data packet; acquiring, by the first edge node, a target routing rule from a network controller according to the target edge node, where the target routing rule refers to a rule of routing between the first edge node and the target edge node; and sending, by the first edge node, the data packet to the target edge node according to the target routing rule, so that the target edge node completes transmission of the data packet.

A fifth aspect provides a transmission control method, including: configuring, by a network controller in a software-defined network SDN, routing information for a first edge node in the SDN, where the routing information includes a rule of routing from the first edge node to each second edge node in the SDN; and sending, by the network controller, the routing information to the first edge node, so that the first edge node determines, based on the routing information when receiving a data packet that needs to be transmitted, a target rule of routing to a target edge node, where the target edge node is a second edge node that the data packet needs to pass through in a process of transmitting the data packet.

BRIEF DESCRIPTION OF THE DRAWINGS

To describe the technical solutions in the embodiments of the present invention more clearly, the following briefly introduces the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

DETAILED DESCRIPTION OF ILLUSTRATIVE EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
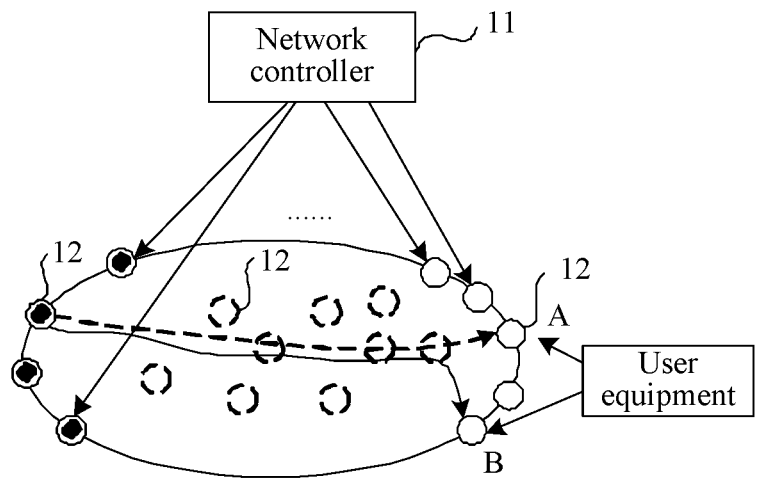
FIG. 1 is a schematic diagram of an SDN application scenario according to an embodiment of the present invention.

In consideration of mobility of a user in a radio network, the embodiments of the present invention provide a data transmission method and a transmission control method, which are used to optimize signaling interworking between a control plane and a user plane, to improve communication efficiency of an SDN. For example, FIG. 1 shows a system architecture of an SDN, where the SDN includes: a network controller 11 and user plane devices 12. As a control plane device of the SDN, the network controller 11 is mainly responsible for user access management, mobility management, scheduling a data transmission path of the entire SDN, and the like. The user plane devices 12 are mainly responsible for policy execution and data forwarding. In this embodiment, the user plane devices 12 are classified into two types, where one type is located in the center of the network (as shown by a dashed-line circle in FIG. 1), and the other type is located on the edge of the network (as shown by a solid-line circle in FIG. 1). In addition, when the SDN in this embodiment is compared with a common SDN, the user plane devices 12 in this embodiment not only include a switch and a router, but also include other devices of a core network and an access network in the radio network, such as a gateway device and a base station device. In an SDN, there may be one or more gateway devices and one or more base station devices. Both a gateway device and a base station device are located on the edge of the SDN, where the base station device (as shown by an empty solid-line circle in FIG. 1) directly faces user equipment in the SDN, and the gateway device (as shown by a dot-inside solid-line circle in FIG. 1) mainly faces a PDN network, such as the Internet, or a data center.

It is noted herein that the gateway device in the embodiments of the present invention may be a packet data network gateway (PDN-GW for short), a gateway general packet radio service (GPRS for short) support node (GGSN for short), a serving gateway (S-GW for short), or the like.

In addition, the embodiments of the present invention impose no limitation on a transmission technology used between the gateway device and the base station device. For example, an end-to-end general data transfer platform (GTP for short) tunneling technology or an end-to-end mobile IP (MIP for short) tunneling technology, a virtual private network (Virtual Private Network, VPN for short) technology, or a Multiprotocol Label Switching (MPLS for short) technology may be used for transmission, or a private line or a tunneling technology may be used in a part of a path for transmission.

The wireless SDN shown in FIG. 1 is an application environment of an implementation manner of the present invention. When the user equipment shown in FIG. 1 moves from a point A to a point B, a corresponding data forwarding path also changes. A dashed line in FIG. 1 shows a data forwarding path when the user equipment is located at the point A, and a solid line in FIG. 1 shows a data forwarding path when the user equipment moves to the point B. If the user equipment, after moving from the point A to the point B, still needs to perform normal communication, the network controller 11 needs to update the data forwarding path in real time according to movement of the user equipment, which causes a large amount of signaling between the user plane device 12 and the network controller 11, and reduces communication efficiency of the entire network. To resolve the problem, the following embodiments of the present invention provide a new SDN architecture.

Figure 2:
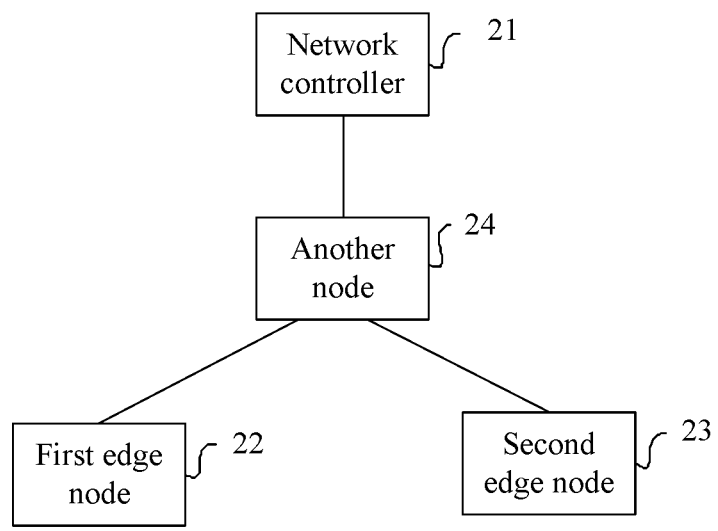
FIG. 2 is an architectural diagram of an SDN according to an embodiment of the present invention.

FIG. 2 is an architectural diagram of an SDN according to an embodiment of the present invention. As shown in FIG. 2, the SDN includes: a network controller 21, a first edge node 22, and at least one second edge node 23. Further, the SDN may further include another node 24, where the another node 24 may be an intermediate node.

The first edge node 22 is configured to: receive a data packet that needs to be transmitted, determine a target edge node, acquire a target routing rule from the network controller 21 according to the target edge node, and send the received data packet to the target edge node according to the acquired target routing rule, so that the target edge node completes transmission of the data packet, where the target edge node refers to a second edge node 23 that the data packet needs to pass through in a process of transmitting the foregoing data packet, and the target routing rule refers to a rule of routing from the first edge node 22 to the target edge node.

The at least one second edge node 23 is configured to: when used as the target edge node, receive the data packet sent by the first edge node 22 according to the target routing rule, and complete transmission of the data packet.

As a control plane device of the SDN, the network controller 21 is responsible for controlling the SDN, and is mainly configured to provide the target routing rule for the first edge node 22.

There may be one or more first edge nodes 22, and the target edge node is one of the at least one second edge node 23.

In the SDN provided in this embodiment, after receiving a data packet that needs to be transmitted, a first edge node determines, from a second edge node, a target edge node that the data packet needs to pass through in transmission of the data packet, then acquires, from a network controller, a target rule of routing to the target edge node, and sends the data packet to the target edge node by using the routing rule, so that the target edge node completes transmission of the data packet. It can be seen that, in the SDN provided in this embodiment, the first edge node determines, from the second edge node, the target edge node that the data packet needs to pass through in transmission of the data packet, which may adapt to a case in which the target edge node changes due to mobility of user equipment; the network controller is responsible for only the rule of routing from the first edge node to the target edge node, and does not need to adjust the rule of routing from the first edge node to the target edge node in real time due to a location change of the user equipment, which effectively lessens a processing burden of the network controller, optimizes signaling interworking between a control plane and a user plane, and improves communication efficiency of the SDN.

In an optional implementation manner, the first edge node 22 may be a gateway device, the second edge node 23 may be a base station device, and the data packet received by the first edge node 22 may be a downlink data packet sent to user equipment.

In an optional implementation manner, the first edge node 22 may be a base station device, the second edge node 23 may be a gateway device, and the data packet received by the first edge node 22 may be an uplink data packet sent by user equipment.

Optionally, the foregoing gateway device may be a PDN-GW, a GGSN, an S-GW, or the like.

In an optional implementation manner, that the first edge node 22 is configured to acquire a target routing rule from the network controller according to the target edge node includes: the first edge node 22 is specifically configured to acquire the target routing rule from routing information that is sent in advance by the network controller 21, where the routing information includes a rule of routing between the first edge node 22 and each second edge node 23 in the SDN. Accordingly, that the network controller 21 is configured to provide the target routing rule for the first edge node 22 includes: the network controller 21 is specifically configured to send the routing information to the first edge node 22 in advance. Optionally, the network controller 21 may provide the routing information in a form of a routing table for the first edge node 22, but the present invention is not limited to the form of a routing table.

In an optional implementation manner, that the first edge node 22 is configured to acquire a target routing rule from the network controller 21 according to the target edge node includes: the first edge node 22 is specifically configured to: after receiving the data packet, send the network controller 21 a request message for requesting the target routing rule, and receive the target routing rule sent by the network controller 21 according to the request message. Accordingly, that the network controller 21 is configured to provide the target routing rule for the first edge node 22 includes: the network controller 21 is specifically configured to receive the request message sent by the first edge node 22, and return the target routing rule to the first edge node 21 according to the request message. The request message may include an identifier of the target edge node, which is used by the network controller 21 to determine a rule of routing from the first edge node 22 to a second edge node 23 requested by the first edge node 22.

Figure 3:
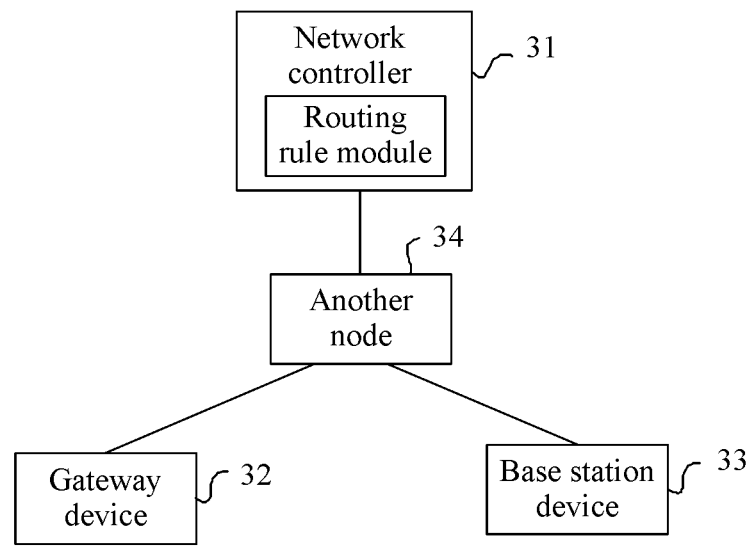
FIG. 3 is another architectural diagram of an SDN according to an embodiment of the present invention.

Based on the foregoing optional implementation manners, FIG. 3 shows another architecture of an SDN provided in an embodiment of the present invention, where the SDN includes: a network controller 31, a gateway device 32, a base station device 33, and another node 34.

The network controller 31 is mainly configured to control the SDN. In an SDN, there may be one or more gateway devices 32 and one or more base station devices 33.

Specifically, in this implementation manner, as shown in FIG. 3, the network controller 31 may include a routing rule module, configured to determine and save a rule of routing between any gateway device 32 and any base station device 33 in advance, so that the gateway device 32 acquires, when receiving a data packet that needs to be forwarded and determining a target base station device, a rule of routing between the gateway device 32 and the target base station device, or the base station device 33 acquires, when receiving a data packet that needs to be forwarded and determining a target gateway device, a rule of routing between the base station device 33 and the target gateway device.

Optionally, the network controller 31 may deliver the rule of routing from any gateway device 32 to any base station device 33 to the gateway device 32 and the base station device 33 in advance, or the network controller 31 may send a routing rule to the gateway device 32 or the base station device 33 according to a request message that is sent by the gateway device 32 or the base station device 33 in real time and that is used to request the routing rule.

Further, optionally, the network controller 31 may deliver a corresponding routing rule in a form of a routing table to the gateway device 32 and the base station device 33.

The gateway device 32 or the base station device 33 in the SDN provided in this embodiment is mainly configured to acquire the routing rule from the network controller 31, to complete transmission of the data packet by using the routing rule when receiving the data packet that needs to be forwarded. For example, for the gateway device 32, receives a downlink data packet sent to user equipment, determines, from the base station device 33, a target base station device that the downlink data packet needs to pass through in transmission of the downlink data packet, acquires, from the network controller 31 according to the determined target base station device, a target rule of routing from the gateway device 32 to the target base station device, and sends the downlink data packet to the target base station device according to the target routing rule, so that the target base station device sends the downlink data packet to the user equipment. For example, for the base station device 33, the base station device 33 receives an uplink data packet sent by user equipment, determines a target gateway device from the gateway device 32, acquires, from the network controller 31 according to the determined target gateway device, a target rule of routing from the base station device 33 to the target gateway device, and sends the uplink data packet to the target gateway device according to the target routing rule, so that the target gateway device forwards the uplink data packet.

Optionally, the gateway device 32 may acquire a target routing rule from the network controller 31 for each downlink data packet of the user equipment; or if the gateway device 32 uses a same target routing rule for a type of downlink data packet sent to the user equipment, and the target routing rule for the same type of downlink data packet has been obtained by means of querying, when another downlink data packet of the same type is processed subsequently, the target routing rule does not need to be acquired again from the network controller 31, and the previously acquired target routing rule for the same type of downlink data packet can be directly used. The same processing manner may be used for the base station device 33.

In the SDN provided above, because locations of the base station device and the gateway device in a network topology remain unchanged, the network topology that connects the base station device and the gateway device is also relatively stable. Based on this, the rule of routing between any gateway device and any base station device that is stored by the network controller in the SDN is relatively static, and the rule of routing between the gateway device and the base station device does not need to be adjusted in real time due to a location change of a user, which effectively lessens a processing burden of the network controller. In addition, the network controller does not need to frequently provide the routing rule for the gateway device or the base station device, which helps reduce signaling interworking between a control plane device (that is, the network controller) and a user plane device (that is, the gateway device or the base station device), and further helps improve communication efficiency of the entire SDN. In addition, user location information in the SDN may be dynamic, and in a process of forwarding the data packet, because the gateway device performs routing by using information about a current location of the user (a base station device currently serving the user), data transmission in a moving process of the user is effectively ensured.

Based on the embodiment shown in FIG. 3, this embodiment provides an implementation manner in which the gateway device determines the target base station device from the base station device, including: the gateway device 32 is specifically configured to: determine a session identifier to which the downlink data packet belongs, and query a correspondence between a session identifier and a base station device according to the session identifier to which the downlink data packet belongs, to determine the target base station device, where the target base station device refers to a base station device corresponding to the session identifier to which the downlink data packet belongs.

It is noted herein that in this embodiment, one session identifier may be corresponding to one session, or may be corresponding to multiple sessions. The case in which one session identifier is corresponding to multiple sessions is applicable to a session aggregation scenario.

Generally, for a data packet based on a session granularity, some sessions require a QoS assurance and have a feature such as long duration, and this type of session belongs to a long session; some other sessions, for example, a large quantity of sessions generated in a web browsing service, one of current mainstream services, mostly have short duration, and this type of session is a short session. Generally a dedicated bearer needs to be established to carry the long session. In addition, due to the long duration, there is a high probability that the user equipment moves during this period, and therefore, the long session has a high requirement on mobility. The short session does not require establishment of a dedicated bearer and may be carried in a default bearer. In addition, due to the short duration, there is a low probability that the user equipment moves. Even if the user equipment moves, the user equipment re-initiates a service request at a transport layer or an application layer, which exerts little impact on user experience. Therefore, the short session also has a low requirement on mobility.

It can be seen that for the long session, the foregoing correspondence between the session identifier and the base station device may be updated in real time by the network controller according to movement of the user equipment, to ensure the requirement of these long sessions on mobility. For the short session, the network controller may not need to be involved in updating of the correspondence between the session identifier and the base station device, and a burden of the network controller is lessened because a short-session service is processed by the gateway device.

Based on the foregoing description, in a scenario in which the downlink data packet belongs to a short session, the gateway device 32 is further configured to: receive, before receiving the downlink data packet, an uplink data packet corresponding to the downlink data packet, and when identifying that the uplink data packet belongs to a new session that uses a default bearer, locally generate, according to the uplink data packet, a target filtering rule used for the downlink data packet, and generate a correspondence between a session identifier to which the uplink data packet belongs and a base station device that currently serves the user equipment.

In addition, in a scenario in which the downlink data packet belongs to a long session, the network controller 31 is further configured to: after learning that the downlink data packet that is received by the gateway device 32 and that is sent to the user equipment belongs to a new session that uses a dedicated bearer, generate a target filtering rule used for the downlink data packet, send the target filtering rule to the gateway device 32, generate a correspondence between the session identifier to which the downlink data packet belongs and a base station device that currently serves the user equipment, and send the gateway device 32 the correspondence between the session identifier to which the downlink data packet belongs and the base station device that currently serves the user equipment.

The gateway device 32 is further configured to: receive the target filtering rule that is sent by the network controller 31 and that is used for the downlink data packet, locally store the target filtering rule, and receive the correspondence between the session identifier to which the downlink data packet belongs and the base station device that currently serves the user equipment, where the correspondence is sent by the network controller 31.

In the foregoing two scenarios, that the gateway device 32 is configured to determine a session identifier to which the downlink data packet belongs includes: the gateway device 32 is specifically configured to determine, according to the target filtering rule used for the downlink data packet, the session identifier to which the downlink data packet belongs. A difference lies in that in the short-session scenario, the target filtering rule is generated by the gateway device 32, while in the long-session scenario, the target filtering rule is generated by the network controller 31 and delivered to the gateway device 32.

Generally, because different sessions are corresponding to different filtering rules, a session identifier to which a data packet belongs may be determined by a filtering rule used for the data packet. Therefore, the gateway device 32 may be specifically configured to perform matching in a locally stored filtering rule according to packet header information of the downlink data packet, acquire the target filtering rule used for the downlink data packet, and determine, according to the target filtering rule, the session identifier to which the downlink data packet belongs. The filtering rule is generally generated according to the packet header information of the data packet. The packet header information of the downlink data packet mainly includes header information of various protocol stacks included in the data packet, such as Media Access Control (MAC for short) protocol header information or IP protocol header information. Further, for example, the IP protocol header information includes information such as a source address, a destination address, and a protocol type.

Figure 4:
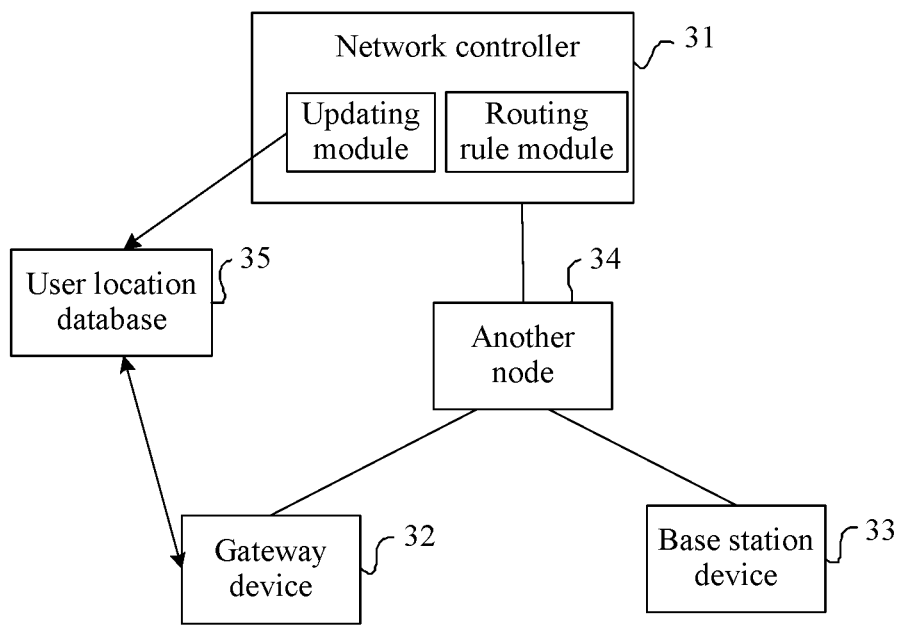
FIG. 4 is still another architectural diagram of an SDN according to an embodiment of the present invention.

Based on the architecture of the SDN shown in FIG. 3, FIG. 4 shows still another architecture of an SDN provided in an embodiment of the present invention, where the SDN not only includes a network controller 31, a gateway device 32, a base station device 33, and another node 34, but also includes a user location database 35.

Specifically, in this implementation manner, the user location database 35 is mainly configured to store the foregoing correspondence between the session identifier and the base station device. The user location database 35 is actually a storage set of a correspondence between a session identifier to which a session initiated by user equipment belongs and a base station device currently serving the user equipment. A main function of the user location database 35 is to enable the gateway device 32 to determine, after receiving a downlink data packet sent to user equipment and based on a session identifier to which the downlink data packet belongs, a target base station device required for forwarding the downlink data packet. A solid line with an arrow in FIG. 4 shows signaling interworking between the user location database 35 and the gateway device 32.

Because different sessions are corresponding to different filtering rules, a session identifier to which a data packet belongs may be determined by a filtering rule used for the data packet. Based on this and the user location database 35, after receiving the downlink data packet sent to the user equipment, the gateway device 32 may specifically perform matching in a locally stored filtering rule according to packet header information of the downlink data packet, acquire a target filtering rule used for the downlink data packet, determine, according to the target filtering rule, the session identifier to which the downlink data packet belongs, and perform a query in the user location database 35 according to the session identifier to which the downlink data packet belongs, to determine the target base station device. The target base station device is actually a base station device corresponding to a session to which the downlink data packet belongs, that is, a base station device that currently serves the user equipment.

Optionally, if the downlink data packet belongs to a new session that uses a default bearer, before receiving the downlink data packet, the gateway device 32 may specifically receive an uplink data packet corresponding to the downlink data packet, and locally generate, according to packet header information of the uplink data packet when identifying that the uplink data packet belongs to a new session that uses a default bearer, a filtering rule used for the downlink data packet, where the filtering rule is the target filtering rule. In addition, the gateway device 32 further stores, in the user location database 35, a correspondence between a session identifier to which the uplink data packet belongs and the base station device that currently serves the user equipment.

It is noted herein that because the foregoing downlink data packet and the uplink data packet corresponding to the downlink data packet belong to a same session, the session identifier to which the downlink data packet belongs and the session identifier to which the uplink data packet corresponding to the downlink data packet belongs are also the same.

Optionally, if the downlink data packet belongs to a new session that uses a dedicated bearer, after learning that the downlink data packet belongs to the new session that uses the dedicated bearer, the network controller 31 may specifically generate the target filtering rule used for the downlink data packet, and send the target filtering rule to the gateway device 32. In addition, the network controller 31 further stores, in the user location database 35, a correspondence between the session identifier to which the downlink data packet belongs and the base station device that currently serves the user equipment.

Optionally, the user location databases 35 in the SDN may be coupled with the network controller 31, which facilitates maintenance and management, or the user location database 35 may be discretely deposed on each gateway device 32, and in this way, each gateway device 32 has one user location database 35, which helps improve efficiency of using the user location database 35 by the gateway device 32.

Optionally, as shown in FIG. 4, the network controller 31 may further include an updating module, configured to update, in the user location database 35 and according to movement of the user equipment, the correspondence between the session identifier to which the downlink data packet belongs and the base station device that currently serves the user equipment. For example, according to information about the user equipment currently connected to the base station device 33 that is reported by the base station device 33, the updating module of the network controller 31 may specifically control updating, in the user location database 35, of the base station device that currently serves the user equipment. For example, in a radio network, when the user equipment is connected to the base station device 33 or is handed over to a new base station device 33, a signaling interworking process of the handover is related to the network controller 31. In the signaling interworking process, the base station device 33 reports the information about the user equipment currently connected to the base station device 33 to the network controller 31. Therefore, the network controller 31 may acquire information about a base station device 33 to which the user equipment is currently connected or a base station device 33 to which the user equipment is handed over. A solid line with an arrow in FIG. 4 shows signaling interworking between the user location database 35 and the network controller 31.

Further, optionally, the updating module of the network controller 31 may directly update, in the user location database 35, the base station device that currently serves the user equipment, or may send an update message to the gateway device 32, so that the gateway device 32 updates, in the user location database 35 and according to the update message, the base station device that currently serves the user equipment. The update message is generated by the updating module of the network controller 31 according to the information about the user equipment currently connected to the base station device 33 that is reported by the base station device 33.

In the SDN provided in this implementation manner, a user location database stores a correspondence between a session identifier and a base station device, and a network controller or a gateway device implements updating, in the user location database, of information about a base station device that currently serves user equipment; therefore, in a process of forwarding a downlink data packet, the gateway device may determine, according to the user location database, the base station device currently serving the user equipment, and further perform routing based on the determined base station device, which effectively ensures data transmission in a moving process of a user.

The embodiments shown in FIG. 3 and FIG. 4 briefly introduce a short-session scenario and a long-session scenario, and the following further describes processing processes of a short session and a long session by using different embodiments.

Figure 5:
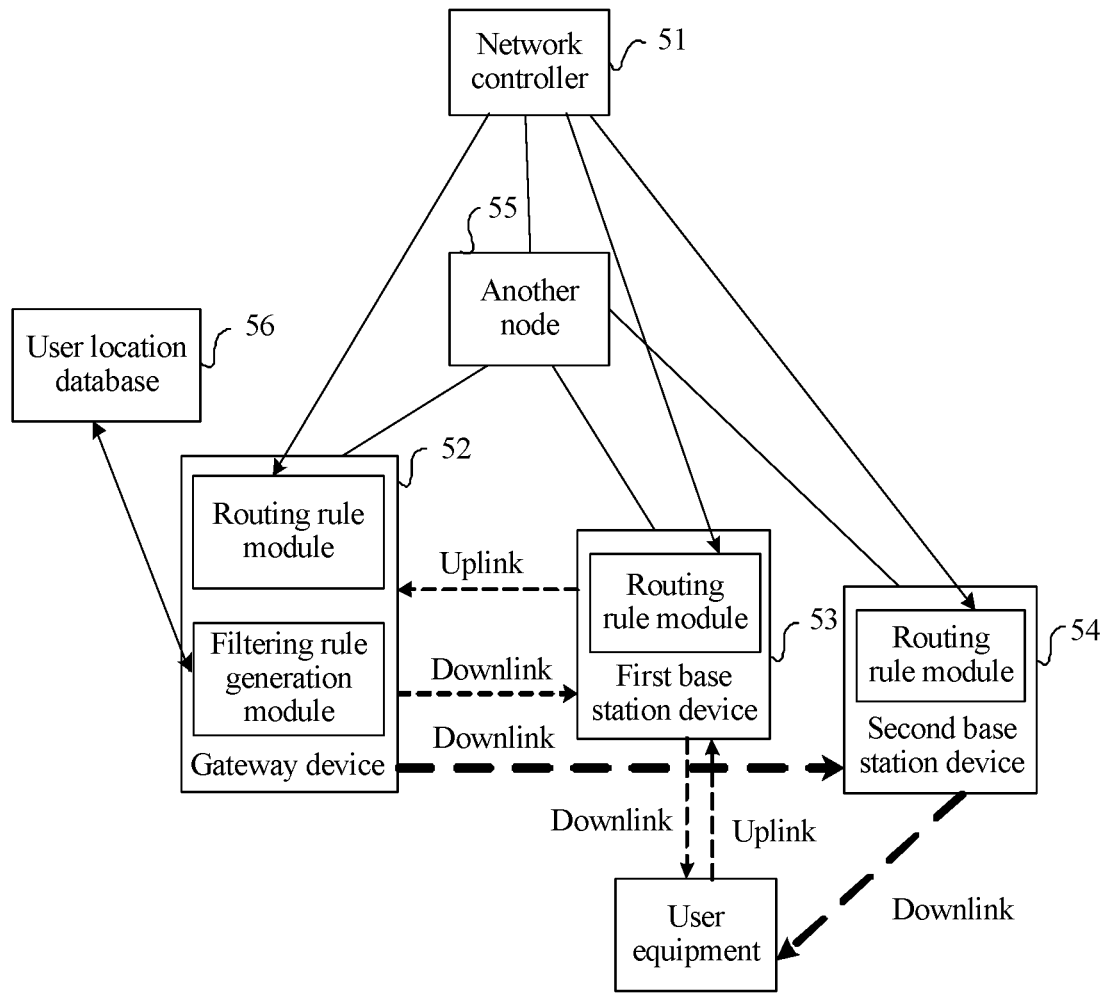
FIG. 5 is yet another architectural diagram of an SDN according to an embodiment of the present invention.

FIG. 5 shows yet another architecture of an SDN according to an embodiment, and the architecture of the SDN is mainly used in a short-session scenario. As shown in FIG. 5, the SDN includes: a network controller 51, a gateway device 52, a first base station device 53, a second base station device 54, another node 55, and a user location database 56.

Specifically, in this implementation manner, the network controller 51 is configured to control the SDN, and is mainly configured to provide a routing rule for the gateway device 52, the first base station device 53, and the second base station device 54, where the routing rule indicates routing, of a downlink data packet sent to user equipment, from the gateway device 52 to the first base station device 53 or the second base station device 54, or may indicate routing, of an uplink data packet sent by user equipment, from the first base station device 53 or the second base station device 54 to the gateway device 52. In this embodiment, the network controller 51 is specifically configured to deliver, to the gateway device 52 in advance, a rule of routing from the gateway device 52 to the first base station device 53 and the second base station device 54, and also deliver, to the first base station device 53 and the second base station device 54 in advance, a rule of routing from the first base station device 53 to the gateway device 52 and a rule of routing from the second base station device 54 to the gateway device 52. Based on this, as shown in FIG. 5, a solid line with an arrow in FIG. 5 shows signaling interworking between the network controller 51 and each of the gateway device 52, the first base station device 53, and the second base station device 54.

The user location database 56 is mainly used to store a correspondence between a session identifier and a base station device.

In this implementation manner, on the assumption that the user equipment accesses a network from the first base station device 53, and initiates a short-session service between the gateway device 52 and the first base station device 53, an uplink data packet of the short-session service is first processed in the first base station device 53. The first base station device 53 may include a routing rule module, mainly configured to receive a routing rule sent by the network controller 51, to forward the uplink data packet to the gateway device 52 by using the routing rule when the uplink data packet sent by the user equipment is received, and also add identifier information of the first base station device 53 to the uplink data packet.

The gateway device 52 may include a routing rule module and a filtering rule generation module. The filtering rule generation module of the gateway device 52 is mainly configured to: find that the uplink data packet sent by the first base station device 53 belongs to a new session that uses a default bearer (that is, a short-session service), generate, according to packet header information of the uplink data packet, a filtering rule for the short-session service to which the uplink data packet belongs, and store, in the user location database 56 and according to the identifier information of the first base station device 53 that is carried in the uplink data packet, a correspondence between a session identifier to which the uplink data packet belongs and the first base station device 53 that currently serves the user equipment. Optionally, the filtering rule generation module of the gateway device 52 may specifically correspondingly store, in the user location database 56, the session identifier to which the uplink data packet belongs and the identifier information of the first base station device 53 that is carried in the uplink data packet. Optionally, the filtering rule generation module of the gateway device 52 may specifically use a destination address of the uplink data packet as a source address of the filtering rule, use a source address of the uplink data packet as a destination address of the filtering rule, and use a protocol type of the uplink data packer as a protocol type of the filtering rule, but the present invention is not limited to this manner of generating the filtering rule.

Further, the filtering rule generation module of the gateway device 52 is further configured to: when the gateway device 52 receives the downlink data packet sent to the user equipment, identify, according to the foregoing generated filtering rule, a session identifier to which the downlink data packet belongs, and perform a query in the user location database 56 according to the session identifier to which the downlink data packet belongs, to acquire, from the database, a base station device (that is, the first base station device 53) corresponding to the session identifier to which the downlink data packet belongs and use the base station device as a target base station device. The routing rule module of the gateway device 52 is mainly configured to receive a routing rule sent by the network controller 51, to forward, by using the routing rule when the downlink data packet sent to the user equipment is received, the downlink data packet to the first base station device 53 that is determined by the filtering rule generation module of the gateway device 52. The first base station device 53 forwards the downlink data packet to the user equipment.

It is further noted that for a short-session process in which a non-dedicated bearer is used, a case may exist in which the user equipment moves before the downlink data packet arrives, that is, a base station device serving the user equipment changes in a process of transmitting the downlink data packet. For example, on the assumption that the user equipment moves from the first base station device 53 to the second base station device 54 before the downlink data packet arrives, the downlink data packet cannot be directly sent to the user equipment after the first base station device 53 receives the downlink data packet. In this case, it can be ensured that the downlink data packet successfully arrives at the user equipment in the following manners:

In a first manner, forwarding is performed between base station devices, that is, when the user equipment is being handed over between the base station devices, because signaling interworking needs to be performed between an original base station device (that is, the first base station device 53) and a new base station device to which the user equipment is handed over (that is, the second base station device 54), the original base station device knows the new base station device to which the target user equipment is handed over, and after the downlink data packet of the user equipment arrives at the original base station device, the original base station device (that is, the first base station device 53) may forward the downlink data packet to the new base station device to which the user equipment is handed over (that is, the second base station device 54). However, this manner requires a path of transmitting service data between the original base station device and the new base station device to which the user equipment is handed over, and forwarding processing performed in a scenario of multiple handovers is highly complex.

In a second manner, discarding triggers resending, that is, an original base station device (that is, the first base station device 53) may directly discard the downlink data packet of the user equipment, and due to a timeout, the user equipment finds that the downlink data packet does not arrive at the user equipment, and re-initiates a service request (the re-initiated service request herein includes a retransmission request at a transport layer or an application layer) by using a new base station device to which the user equipment is handed over (that is, the second base station device 54), to acquire the downlink data packet. In this way, the new base station device to which the user equipment is handed over forwards the service request to the gateway device, and the gateway device finds that a filtering rule corresponding to the service request already exists and identifies a corresponding session. However, the base station device that sends the service request changes, and the gateway device may update, in the user location database 56, the base station device that currently serves the user equipment, so that the downlink data packet can be sent to the new base station device to which the user equipment is handed over (that is, the second base station device 54), and then the new base station device to which the user equipment is handed over forwards the downlink data packet to the user equipment.

In FIG. 5, a thin dashed-line with an arrow indicates data interaction before the user equipment moves, and a bold dashed-line with an arrow indicates data interaction after the user equipment moves.

Figure 6:
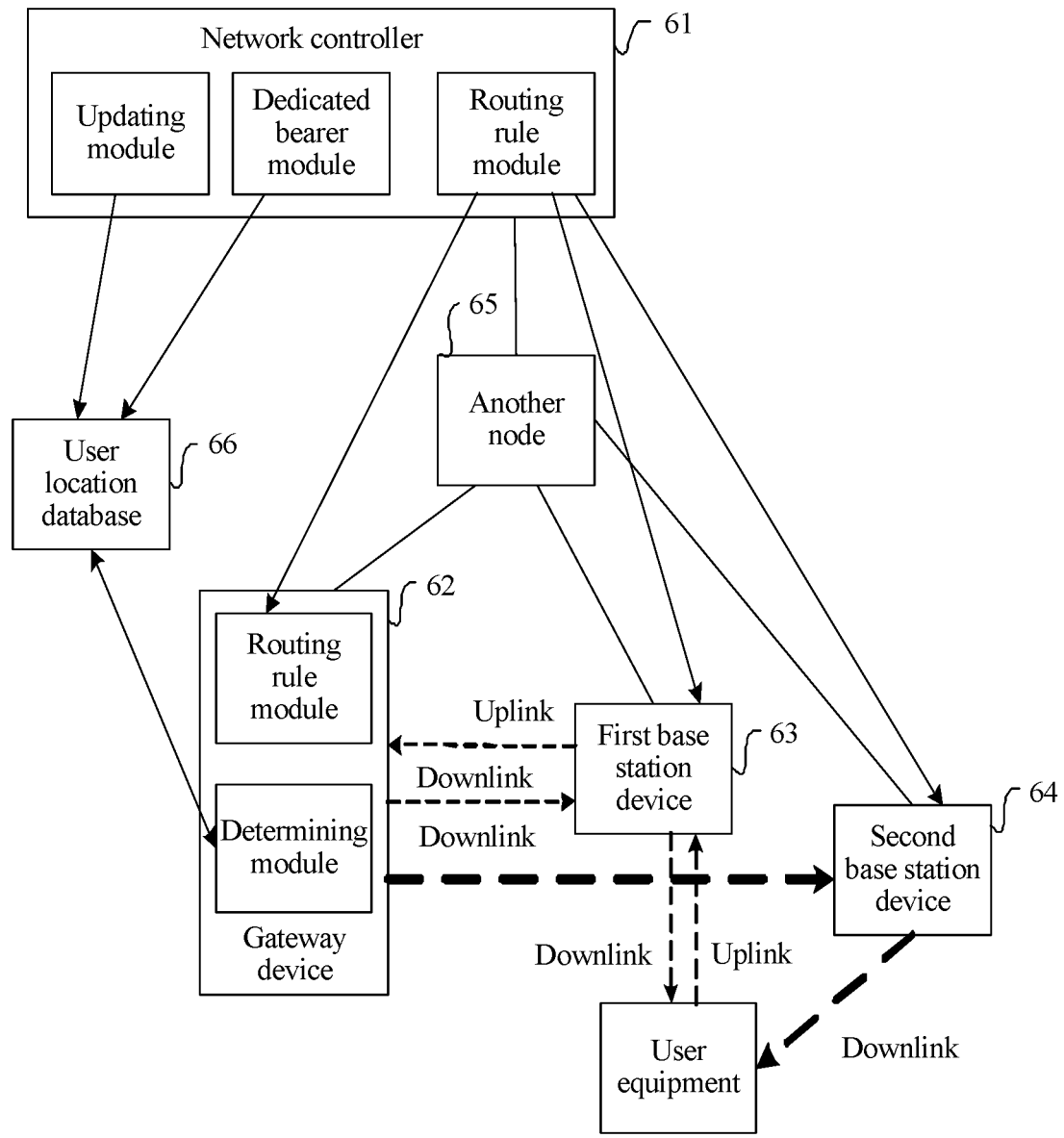
FIG. 6 is still yet another architectural diagram of an SDN according to an embodiment of the present invention.

FIG. 6 shows still yet another architecture of an SDN according to an embodiment, and the architecture of the SDN is mainly used in a long-session scenario. As shown in FIG. 6, the SDN includes: a network controller 61, a gateway device 62, a first base station device 63, a second base station device 64, another node 65, and a user location database 66.

Specifically, in this implementation manner, on the assumption that user equipment accesses a network from the first base station device 63, and initiates a service of a session between the gateway device 62 and the first base station device 63, the session belongs to a long session.

The network controller 61 includes a routing rule module, mainly configured to provide a routing rule for the gateway device 62, the first base station device 63, and the second base station device 64, where the routing rule indicates routing, of a downlink data packet sent to the user equipment, from the gateway device 62 to the first base station device 63 or the second base station device 64, or may indicate routing, of an uplink data packet sent by the user equipment, from the first base station device 63 or the second base station device 64 to the gateway device 62. In this embodiment, the network controller 61 is specifically configured to: deliver, to the gateway device 62 in advance, a rule of routing from the gateway device 62 to the first base station device 63 and the second base station device 64, and also deliver, to the first base station device 63 and the second base station device 64 in advance, a rule of routing from the first base station device 63 to the gateway device 62 and a rule of routing from the second base station device 64 to the gateway device 62. Based on this, as shown in FIG. 6, a solid line with an arrow in FIG. 6 shows signaling interworking between the network controller 61 and each of the gateway device 62, the first base station device 63, and the second base station device 64.

The user location database 66 is mainly used to store a correspondence between a session identifier and a base station device.

Further, the network controller 61 further includes a dedicated bearer module. The dedicated bearer module of the network controller 61 is configured to: after learning that the downlink data packet sent to the user equipment belongs to a new session that uses a dedicated bearer (that is, the session is a long session), allocate the dedicated bearer to the session to which the downlink data packet belongs, generate a target filtering rule used for the downlink data packet, and send the target filtering rule to the gateway device 62, so that the gateway device 62 determines, according to the target filtering rule, a session identifier to which the downlink data packet belongs. In addition, the dedicated bearer module of the network controller 61 may be further configured to store, in the user location database 66, a correspondence between the session identifier to which the downlink data packet belongs and the first base station device 63 that currently serves the user equipment, so that the gateway device 62 can perform a query in the user location database 66 according to the determined session identifier to which the downlink data packet belongs, to determine the first base station device 63 that currently serves the user equipment.

The gateway device 62 may include a determining module and a routing rule module. The determining module of the gateway device 62 is mainly configured to: determine, according to packet header information of the received downlink data packet sent to the user equipment, the target filtering rule used for the downlink data packet, to determine the session identifier to which the downlink data packet belongs, and perform a query in the user location database 66 according to the session identifier to which the downlink data packet belongs, to determine the first base station device 63 that currently serves the user equipment. The routing rule module of the gateway device 62 is mainly configured to receive a routing rule sent by the network controller 61, to forward the downlink data packet to the first base station device 63 by using the routing rule when the downlink data packet sent to the user equipment is received.

Further, the network controller 61 may further include an updating module, mainly configured to update, in the user location database 66 and according to movement of the user equipment, the correspondence between the session identifier to which the downlink data packet belongs and the base station device that currently serves the user equipment. On the assumption that the user equipment is handed over from the first base station device 63 to the second base station device 64, the updating module of the network controller 61 updates, in the user location database 66, the base station device that currently serves the user equipment to the second base station device 64. In this way, after the gateway device 62 receives the downlink data packet, the determining module of the gateway device 62 may determine the second base station device 64 from the user location database 66; the routing rule module of the gateway device 62 acquires, from the network controller 61, a rule of routing to the second base station device 64, and forwards the downlink data packet to the second base station device 64 by using the routing rule; then the second base station device 64 forwards the downlink data packet to the user equipment.

In FIG. 6, a thin dashed-line with an arrow indicates data interaction before the user equipment moves, and a bold dashed-line with an arrow indicates data interaction after the user equipment moves.

In the foregoing implementation manner, a manner in which the dedicated bearer module of the network controller 61 learns that the downlink data packet sent to the user equipment belongs to a new session that uses a dedicated bearer includes but is not limited to the following several manners:

In a first manner, when requiring establishment of a dedicated bearer, the user equipment sends a dedicated-bearer session request to the network controller 61, so that the dedicated bearer module of the network controller 61 can learn that the user equipment requires establishment of the dedicated bearer.

Figure 7:
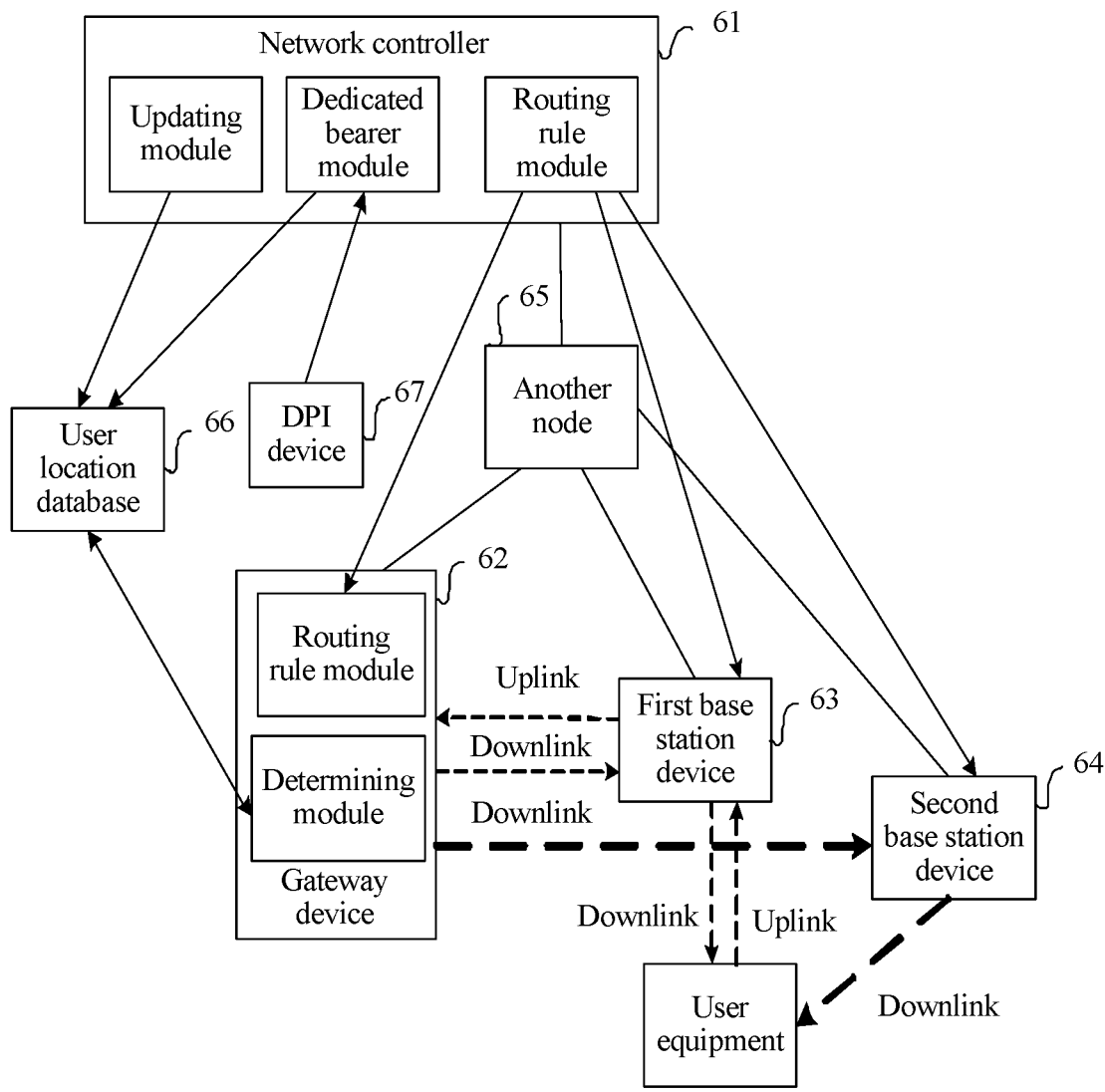
FIG. 7 is a further architectural diagram of an SDN according to an embodiment of the present invention.

In a second manner, as shown in FIG. 7, the SDN may further include a deep packet inspection (DPI for short) device 67, and the DPI device 67 determines, by using a DPI technology, whether a dedicated bearer needs to be established for a session initiated by the user equipment, and notifies the network controller 61 of a result of the determining. For example, a service type for which a dedicated bearer needs to be established, such as video or IP call (VOIP for short), may be set in advance, and when identifying that the session initiated by the user equipment is a VOIP service, the DPI device 67 may determine that the dedicated bearer needs to be established, and further notify the network controller 61 that the dedicated bearer needs to be established. In specific implementation, the DPI device 67 may be deployed in the gateway device 62, the first base station device 63, or the second base station device 64, or may be independently deployed.

It is noted herein that in the foregoing implementation manners, the gateway device may send the downlink data packet to the target base station device by using a source routing technology and according to the target routing rule. Source routing means that some or all data nodes that a data packet passes through are specified in a sending node, and source routing is generally used inside a network that is mutually trusted among all nodes. Source routing is classified into two types: strict source routing and loose source routing. Strict source routing means that a data packet has to pass through each node in a specified path, any intermediate node is not allowed between adjacent nodes, and a sequence of passing through the nodes is not allowed to be changed, either. There are no such restrictions on loose source routing. In this embodiment of the present invention, both strict source routing and loose source routing may be used.

Strict source routing is used as an example. A routing rule of source routing may be simply a series of port numbers, for example, a combination of 2|4|5|2|, where a head node adds the routing rule, that is, the combination of 2|4|5|2|, to a packet header of a data packet and sends the data packet, and the first node that receives the data packet executes forwarding according to the first routing indicator 2 in the routing rule, and deletes the first routing indicator, to obtain a remaining routing rule, that is, a combination of 4|5|2|. That the first node that receives the data packet executes forwarding according to the first routing indicator 2 means that the data packet is forwarded from a port 2 of the node, and because a next-hop node connected to the port 2 is determined, strict data path forwarding is implemented. Similarly, the next node that receives the data packet also performs forwarding according to the first routing indicator, and deletes the first routing indicator from the packet header, and therefore, a forwarding path of the data packet can be strictly executed, and the sending node does not need to send the routing rule to all nodes.

For a downlink data packet sent to user equipment, a process in which a gateway device uses a source routing technology is as follows: The gateway device may add a target routing rule to the downlink data packet, and then send the downlink data packet that carries the target routing rule, so that the downlink data packet can be sent to a target base station device. By using a source path technology, the gateway device in this embodiment may effectively reduce signaling interworking performed between the gateway device and each node in a transmission path for transmitting a routing rule, which means that the gateway device needs to interact with only a base station device, so that communication efficiency of an entire SDN can be further improved.

Figure 8:
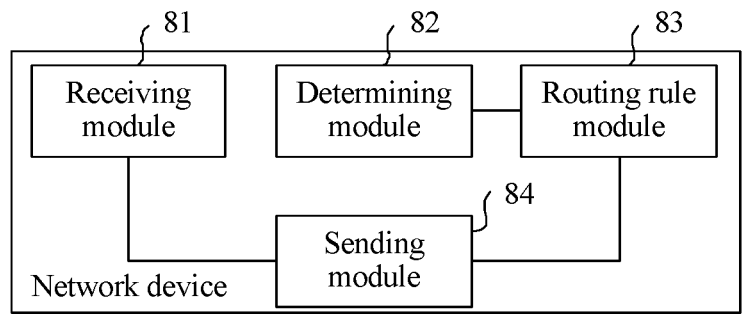
FIG. 8 is a schematic structural diagram of a network device according to an embodiment of the present invention.

FIG. 8 is a schematic structural diagram of a network device according to an embodiment of the present invention. The network device is located in an SDN, and the network device is a first edge node. As shown in FIG. 8, the network device includes: a receiving module 81, a determining module 82, a routing rule module 83, and a sending module 84.

The receiving module this configured to receive a data packet that needs to be transmitted.

The determining module 82 is configured to determine a target edge node, where the target edge node refers to a second edge node, in the SDN, that the data packet needs to pass through in a process of transmitting the data packet received by the receiving module 81.

The routing rule module 83 is connected to the determining module 82 and is configured to acquire a target routing rule from a network controller in the SDN according to the target edge node determined by the determining module 82, where the target routing rule refers to a rule of routing between the first edge node and the target edge node determined by the determining module 82.

The sending module 84 is connected to the receiving module 81 and the routing rule module 83 and is configured to send, according to the target routing rule acquired by the routing rule module 83, the data packet received by the receiving module 81 to the target edge node, so that the target edge node completes transmission of the data packet.

In an optional implementation manner, the first edge node may be a gateway device, the data packet received by the receiving module 81 may be a downlink data packet sent to user equipment, and the second edge node may be a base station device.

In another optional implementation manner, the first edge node may be a base station device, the second edge node may be a gateway device, and the data packet received by the receiving module 81 may be an uplink data packet sent by user equipment.

In an optional implementation manner, the network controller may deliver routing information to the first edge node in advance, where the routing information includes a rule of routing between the first edge node and each second edge node in the SDN. Based on this, the routing rule module 83 may be specifically configured to acquire the target routing rule from the routing information that is sent in advance by the network controller.

In another optional implementation manner, the network controller may not deliver routing information to the first edge node, but may return the target routing rule to the first edge node according to a real-time request of the first edge node. Based on this, the routing rule module 83 may be specifically configured to: after the receiving module 81 receives the data packet, send the network controller a request message for requesting the target routing rule, and receive the target routing rule sent by the network controller according to the request message. The request message may include an identifier of the target edge node, which is used by the network controller to determine a rule of routing from the first edge node to a second edge node requested by the first edge node.

In an optional implementation manner, if the first edge node is a gateway device and the second edge node is a base station device, the determining module 82 may be specifically configured to: determine a session identifier to which the downlink data packet belongs, and query a correspondence between a session identifier and a base station device according to the session identifier to which the downlink data packet belongs, to determine a target base station device, where the target base station device refers to a base station device corresponding to the session identifier to which the downlink data packet belongs. Optionally, a user location database is set in the SDN, and the user location database may be used to store the correspondence between the session identifier and the base station device.

It is noted herein that in this embodiment, one session identifier may be corresponding to one session, or may be corresponding to multiple sessions. The case in which one session identifier is corresponding to multiple sessions is applicable to a session aggregation scenario.

Figure 9:
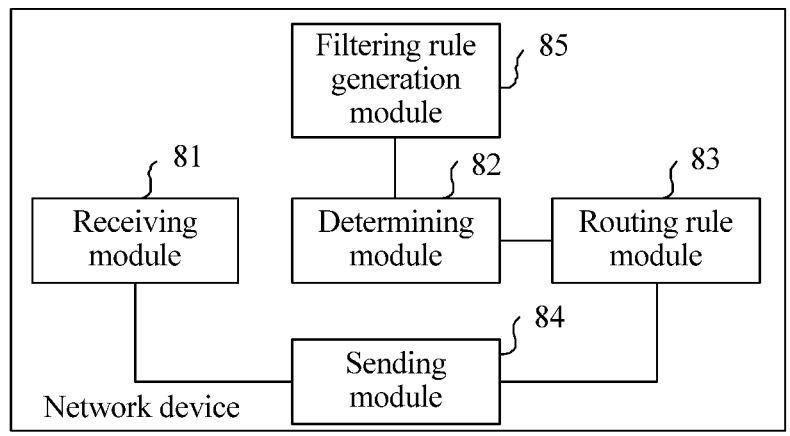
FIG. 9 is a schematic structural diagram of another network device according to an embodiment of the present invention.

Further, optionally, if the downlink data packet received by the receiving module 81 belongs to a session that uses a default bearer (that is, a short session), a filtering rule used for the downlink data packet may be generated by the first edge node. Specifically, before receiving the downlink data packet, the receiving module 81 may be further configured to receive an uplink data packet corresponding to the downlink data packet. Based on this, as shown in FIG. 9, the network device further includes: a filtering rule generation module 85. The filtering rule generation module 85 is connected to the determining module 82 and is configured to provide a target filtering rule for the determining module 82. The filtering rule generation module 85 is configured to: when identifying that the uplink data packet received by the receiving module 81 belongs to a new session that uses a default bearer, locally generate, according to the uplink data packet, the target filtering rule used for the downlink data packet, and generate a correspondence between a session identifier to which the uplink data packet belongs and a base station device that currently serves the user equipment. It is noted herein that because the downlink data packet and the uplink data packet corresponding to the downlink data packet belong to a same session, the session identifier to which the downlink data packet belongs and the session identifier to which the uplink data packet corresponding to the downlink data packet belongs are also the same.

Further, optionally, if the downlink data packet received by the receiving module 81 belongs to a session that uses a dedicated bearer (that is, a long session), a filtering rule used for the downlink data packet may be generated by the network controller and delivered to the first edge node. Based on this, the receiving module 81 is further configured to receive a target filtering rule sent by the network controller, locally store the target filtering rule, and receive a correspondence between the session identifier to which the downlink data packet belongs and a base station device that currently serves the user equipment, where the correspondence is sent by the network controller, and the target filtering rule is generated for the downlink data packet after the network controller learns that the downlink data packet belongs to a new session that uses a dedicated bearer.

Based on the foregoing two cases, that the determining module 82 is configured to determine a session identifier to which the downlink data packet belongs includes: the determining module 82 may be specifically configured to determine, according to the target filtering rule used for the downlink data packet, the session identifier to which the downlink data packet belongs. A difference lies in that in a short-session scenario, the target filtering rule used for the downlink data packet is generated by the first edge node (that is, the gateway device), while in a long-session scenario, the target filtering rule used for the downlink data packet is generated by the network controller and delivered to the gateway device.

For a working procedure implemented by the network device provided in this embodiment based on the foregoing function modules, refer to the description of the foregoing system embodiment, and details are not described herein again.

The network device provided in this embodiment may be used as a first edge node in an SDN, and after receiving a data packet that needs to be transmitted, the first edge node determines, from a second edge node in the SDN, a target edge node that the data packet needs to pass through in transmission of the data packet, then acquires, from a network controller, a target rule of routing from the first edge node to the target edge node, and sends the data packet to the target edge node by using the routing rule, so that the target edge node completes transmission of the data packet. In a data transmission process, the first edge node provided in this embodiment determines, from the second edge node, the target edge node that the data packet needs to pass through in transmission of the data packet, which may adapt to a case in which the target edge node changes due to mobility of user equipment; the network controller is responsible for only the rule of routing from the first edge node to the target edge node, and does not need to adjust the rule of routing from the first edge node to the target edge node in real time due to a location change of the user equipment, which effectively lessens a processing burden of the network controller, optimizes signaling interworking between a control plane and a user plane, and improves communication efficiency of the SDN.

Figure 10:
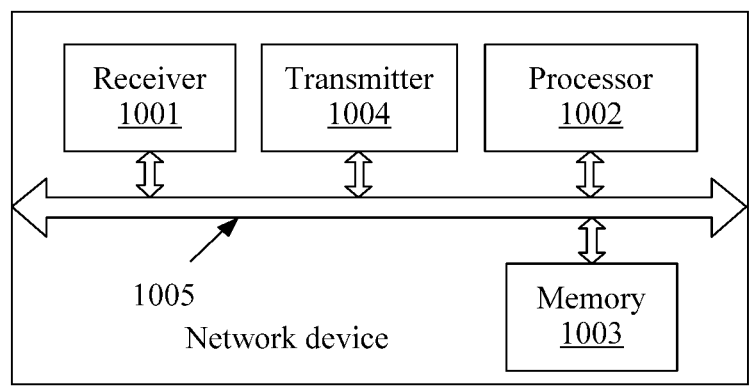
FIG. 10 is a schematic structural diagram of still another network device according to an embodiment of the present invention.

FIG. 10 is a schematic structural diagram of still another network device according to an embodiment of the present invention. The network device is located in an SDN, and the network device is a first edge node. As shown in FIG. 10, the network device includes: a receiver 1001, a processor 1002, a memory 1003, and a transmitter 1004.

The receiver 1001 is configured to receive a data packet that needs to be transmitted.

The memory 1003 may include a read-only memory and a random access memory, and provides an instruction and data for the processor 1002. A part of the memory 1003 may further include a non-volatile random access memory (NVRAM).

The memory 1003 stores the following elements: an executable module or a data structure, or a subset thereof, or an extended set thereof; an operating instruction, including various operating instructions, which are used to implement various operations; and an operating system, including various system programs, which are used to implement various basic services and process hardware-based tasks.

In this embodiment of the present invention, the processor 1002 executes the following operation by invoking an operating instruction stored in the memory 1003 (the operating instruction may be stored in the operating system): determining a target edge node, and acquiring a target routing rule from a network controller in the SDN according to the determined target edge node, where the target edge node refers to a second edge node, in the SDN, that the data packet needs to pass through in a process of transmitting the data packet received by the receiver 1001, and the target routing rule refers to a rule of routing between the first edge node and the target edge node.

The transmitter 1004 is configured to send, according to the target routing rule acquired by the processor 1002, the data packet received by the receiver 1001 to the target edge node, so that the target edge node completes transmission of the data packet.

Optionally, the processor 1002 may control an operation of the first edge node in this embodiment, and the processor 1002 may also be referred to as a CPU. The memory 1003 may include a read-only memory and a random access memory, and provides an instruction and data for the processor 1002. A part of the memory 1003 may further include a non-volatile random access memory (NVRAM). In a specific application, all components of a base station device in this embodiment are coupled together by using a bus system 1005, where in addition to a data bus, the bus system 1005 may further include a power supply bus, a control bus, a status signal bus, and the like. However, for clear description, various types of buses in the figure are marked as the bus system 1005.

The methods disclosed in the foregoing embodiments of the present invention may be applied to the processor 1002, or implemented by the processor 1002. The processor 1002 may be an integrated circuit chip and has a signal processing capability. In an implementation process, the steps in the foregoing methods may be completed by an integrated logic circuit of hardware or an instruction in a form of software in the processor 1002. The foregoing processor 1002 may be a general purpose processor, a digital signal processor (DSP), an application-specific integrated circuit (ASIC), a field programmable gate array (FPGA), or another programmable logic device, a discrete gate or transistor logic device, or a discrete hardware component. The general purpose processor may be a microprocessor or the processor may be any conventional processor or the like. The steps of the methods disclosed with reference to the embodiments of the present invention may be directly executed and completed by a hardware decoding processor, or may be executed and completed by a combination of hardware and software modules in the decoding processor. The software module may be located in a mature storage medium in the field, such as a random access memory, a flash memory, a read-only memory, a programmable read-only memory, an electrically-erasable programmable memory, or a register. The storage medium is located in the memory 1003, and the processor 1002 reads information in the memory 1003 and completes the steps in the foregoing methods in combination with hardware of the processor 1002.

In an optional implementation manner, the first edge node may be a gateway device, the data packet received by the receiver 1001 may be a downlink data packet sent to user equipment, and the second edge node may be a base station device.

In another optional implementation manner, the first edge node may be a base station device, the second edge node may be a gateway device, and the data packet received by the receiver 1001 may be an uplink data packet sent by user equipment.

In an optional implementation manner, the network controller may deliver routing information to the first edge node in advance, where the routing information includes a rule of routing between the first edge node and each second edge node in the SDN. Based on this, the receiver 1001 is further configured to receive the routing information that is sent in advance by the network controller. The processor 1002 may be specifically configured to acquire the target routing rule from the routing information that is sent in advance by the network controller.

In another optional implementation manner, the network controller may not deliver routing information to the first edge node, but may return the target routing rule to the first edge node according to a real-time request of the first edge node. Based on this, the processor 1002 may be specifically configured to: after the receiver 1001 receives the data packet, send, by using the transmitter 1004, the network controller a request message for requesting the target routing rule, and receive, by using the receiver 1001, the target routing rule sent by the network controller according to the request message. Accordingly, the transmitter 1004 is further configured to send the network controller the request message for requesting the target routing rule, and the receiver 1001 is further configured to receive the target routing rule sent by the network controller according to the request message. The request message may include an identifier of the target edge node, which is used by the network controller to determine a rule of routing from the first edge node to a second edge node requested by the first edge node.

In an optional implementation manner, if the first edge node is a gateway device and the second edge node is a base station device, the processor 1002 may be specifically configured to: determine a session identifier to which the downlink data packet belongs, and query a correspondence between a session identifier and a base station device according to the session identifier to which the downlink data packet belongs, to determine a target base station device, where the target base station device refers to a base station device corresponding to the session identifier to which the downlink data packet belongs. Optionally, a user location database is set in the SDN, and the user location database may be used to store the correspondence between the session identifier and the base station device.

It is noted herein that in this embodiment, one session identifier may be corresponding to one session, or may be corresponding to multiple sessions. The case in which one session identifier is corresponding to multiple sessions is applicable to a session aggregation scenario.

Further, optionally, if the downlink data packet received by the receiver 1001 belongs to a session that uses a default bearer (that is, a short session), a filtering rule used for the downlink data packet may be generated by the first edge node. Specifically, before receiving the downlink data packet, the receiver 1001 may further receive an uplink data packet corresponding to the downlink data packet. Based on this, the processor 1002 is further configured to: when identifying that the uplink data packet received by the receiver 1001 belongs to a new session that uses a default bearer, locally generate, according to packet header information of the uplink data packet, a target filtering rule used for the uplink data packet, and generate a correspondence between a session identifier to which the uplink data packet belongs and a base station device that currently serves the user equipment. It is noted herein that because the downlink data packet and the uplink data packet corresponding to the downlink data packet belong to a same session, the session identifier to which the downlink data packet belongs and the session identifier to which the uplink data packet corresponding to the downlink data packet belongs are also the same.

Further, optionally, if the downlink data packet received by the receiver 1001 belongs to a session that uses a dedicated bearer (that is, a long session), a filtering rule used for the downlink data packet may be generated by the network controller and delivered to the first edge node. Based on this, the receiver 1001 is further configured to receive a target filtering rule sent by the network controller, locally store the target filtering rule, and receive a correspondence between the session identifier to which the downlink data packet belongs and a base station device that currently serves the user equipment, where the correspondence is sent by the network controller, and the target filtering rule is generated for the downlink data packet after the network controller learns that the downlink data packet belongs to a new session that uses a dedicated bearer.

Based on the foregoing two cases, that the processor 1002 is configured to determine a session identifier to which the downlink data packet belongs includes: the processor 1002 may be specifically configured to determine, according to the target filtering rule used for the downlink data packet, the session identifier to which the downlink data packet belongs. A difference lies in that in a short-session scenario, the target filtering rule used for the downlink data packet is generated by the first edge node (that is, the gateway device), while in a long-session scenario, the target filtering rule used for the downlink data packet is generated by the network controller and delivered to the gateway device.

For a working procedure implemented by the network device provided in this embodiment, refer to the description of the foregoing system embodiment, and details are not described herein again.

The network device provided in this embodiment may be used as a first edge node in an SDN, and after receiving a data packet that needs to be transmitted, the first edge node determines, from a second edge node in the SDN, a target edge node that the data packet needs to pass through in transmission of the data packet, then acquires, from a network controller, a target rule of routing from the first edge node to the target edge node, and sends the data packet to the target edge node by using the routing rule, so that the target edge node completes transmission of the data packet. In a data transmission process, the network device provided in this embodiment determines, from the second edge node, the target edge node that the data packet needs to pass through in transmission of the data packet, which may adapt to a case in which the target edge node changes due to mobility of user equipment; the network controller is responsible for only the rule of routing from the first edge node to the target edge node, and does not need to adjust the rule of routing from the first edge node to the target edge node in real time due to a location change of the user equipment, which effectively lessens a processing burden of the network controller, optimizes signaling interworking between a control plane and a user plane, and improves communication efficiency of the SDN.

Figure 11:
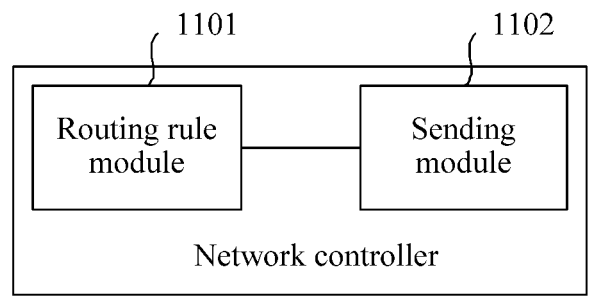
FIG. 11 is a schematic structural diagram of a network controller according to an embodiment of the present invention.

FIG. 11 is a schematic structural diagram of a network controller according to an embodiment of the present invention. The network controller is located in an SDN. As shown in FIG. 11, the network controller includes: a routing rule module 1101 and a sending module 1102.

The routing rule module 1101 is configured to configure routing information for a first edge node in the SDN, where the routing information includes a rule of routing from the first edge node to each second edge node in the SDN.

The sending module 1102 is connected to the routing rule module 1101 and is configured to send the first edge node the routing information configured by the routing rule module 1101, so that the first edge node determines, based on the routing information when receiving a data packet that needs to be transmitted, a target rule of routing to a target edge node, where the target edge node is a second edge node that the data packet needs to pass through in a process of transmitting the data packet.

In an optional implementation manner, the first edge node may be a gateway device, the data packet received by the first edge node may be a downlink data packet sent to user equipment, and the second edge node may be a base station device.

In another optional implementation manner, the first edge node may be a base station device, the second edge node may be a gateway device, and the data packet received by the first edge node may be an uplink data packet sent by user equipment.

Figure 12:
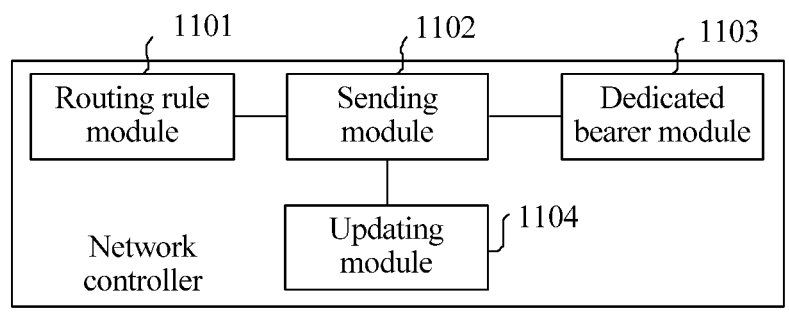
FIG. 12 is a schematic structural diagram of another network controller according to an embodiment of the present invention.

In an optional implementation manner, as shown in FIG. 12, the network controller further includes: a dedicated bearer module 1103.

The dedicated bearer module 1103 is configured to: after learning that the downlink data packet belongs to a new session that uses a dedicated bearer, generate a target filtering rule used for the downlink data packet, and generate a correspondence between a session identifier to which the downlink data packet belongs and a base station device that currently serves the user equipment.

Accordingly, the sending module 1102 is further connected to the dedicated bearer module 1103 and is configured to: send the target filtering rule generated by the dedicated bearer module 1103 to the gateway device, so that the gateway device determines, according to the target filtering rule, the session identifier to which the downlink data packet belongs; and send the gateway device the correspondence between the session identifier to which the downlink data packet belongs and the base station device that currently serves the user equipment, so that the gateway device determines a target base station device.

Further, as shown in FIG. 12, the network controller further includes: an updating module 1104. The updating module 1104 is configured to update, according to movement of the user equipment, the correspondence between the session identifier to which the downlink data packet belongs and the base station device that currently serves the user equipment.

For a working procedure implemented by the network controller provided in this embodiment based on the foregoing function modules, refer to the description of the foregoing system embodiment, and details are not described herein again.

The network controller provided in this embodiment needs to be responsible for only a rule of routing from a first edge node to a target edge node, and does not need to adjust the rule of routing from the first edge node to the target edge node in real time due to a location change of user equipment; therefore, a processing burden of the network controller is relatively light, which helps optimize signaling interworking between a control plane and a user plane, and improves communication efficiency of an SDN.

Figure 13:
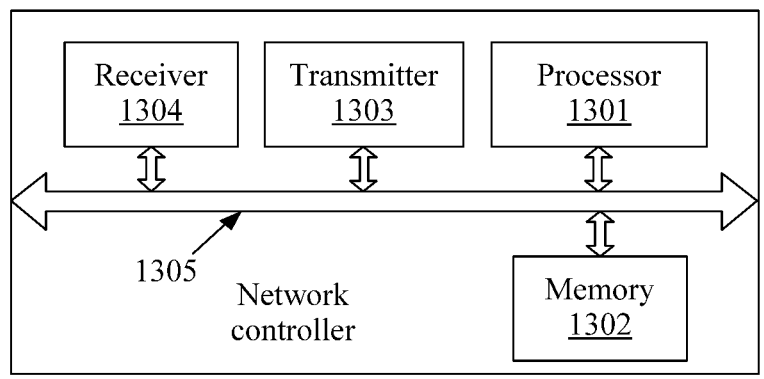
FIG. 13 is a schematic structural diagram of still another network controller according to an embodiment of the present invention.

FIG. 13 is a schematic structural diagram of still another network controller according to an embodiment of the present invention. The network controller is located in an SDN. As shown in FIG. 13, the network controller includes: a processor 1301, a memory 1302, and a transmitter 1303.

The memory 1302 may include a read-only memory and a random access memory, and provides an instruction and data for the processor 1301. A part of the memory 1302 may further include a non-volatile random access memory (NVRAM).

The memory 1302 stores the following elements: an executable module or a data structure, or a subset thereof, or an extended set thereof; an operating instruction, including various operating instructions, which are used to implement various operations; and an operating system, including various system programs, which are used to implement various basic services and process hardware-based tasks.

In this embodiment of the present invention, the processor 1301 executes the following operation by invoking an operating instruction stored in the memory 1302 (the operating instruction may be stored in the operating system): configuring routing information for a first edge node in the SDN, where the routing information includes a rule of routing from the first edge node to each second edge node in the SDN.

The transmitter 1303 is configured to send the first edge node the routing information configured by the processor 1301, so that the first edge node determines, based on the routing information when receiving a data packet that needs to be transmitted, a target rule of routing to a target edge node, where the target edge node is a second edge node that the data packet needs to pass through in a process of transmitting the data packet.

Optionally, the processor 1301 may control an operation of the network controller in this embodiment, and the processor 1301 may also be referred to as a CPU. The memory 1302 may include a read-only memory and a random access memory, and provides an instruction and data for the processor 1301. A part of the memory 1302 may further include a non-volatile random access memory (NVRAM). In a specific application, all components of the network controller in this embodiment are coupled together by using a bus system 1305, where in addition to a data bus, the bus system 1305 may further include a power supply bus, a control bus, a status signal bus, and the like. However, for clear description, various types of buses in the figure are marked as the bus system 1305.

The methods disclosed in the foregoing embodiments of the present invention may be applied to the processor 1301, or implemented by the processor 1301. The processor 1301 may be an integrated circuit chip and has a signal processing capability. In an implementation process, the steps in the foregoing methods may be completed by an integrated logic circuit of hardware or an instruction in a form of software in the processor 1301. The foregoing processor 1301 may be a general purpose processor, a digital signal processor (DSP), an application-specific integrated circuit (ASIC), a field programmable gate array (FPGA), or another programmable logic device, a discrete gate or transistor logic device, or a discrete hardware component. The general purpose processor may be a microprocessor or the processor may be any conventional processor or the like. The steps of the methods disclosed with reference to the embodiments of the present invention may be directly executed and completed by a hardware decoding processor, or may be executed and completed by a combination of hardware and software modules in the decoding processor. The software module may be located in a mature storage medium in the field, such as a random access memory, a flash memory, a read-only memory, a programmable read-only memory, an electrically-erasable programmable memory, or a register. The storage medium is located in the memory 1302, and the processor 1301 reads information in the memory 1302 and completes the steps in the foregoing methods in combination with hardware of the processor 1301.

In an optional implementation manner, the first edge node may be a gateway device, the data packet received by the first edge node may be a downlink data packet sent to user equipment, and the second edge node may be a base station device.

In another optional implementation manner, the first edge node may be a base station device, the second edge node may be a gateway device, and the data packet received by the first edge node may be an uplink data packet sent by user equipment.

Optionally, if the first edge node may be a gateway device and the second edge node may be a base station device, the processor 1301 may be further configured to: after learning that the downlink data packet belongs to a new session that uses a dedicated bearer, generate a target filtering rule used for the downlink data packet, and generate a correspondence between a session identifier to which the downlink data packet belongs and a base station device that currently serves the user equipment.

Accordingly, the transmitter 1303 is further configured to: send the target filtering rule generated by the processor 1301 to the gateway device, so that the gateway device determines, according to the target filtering rule, the session identifier to which the downlink data packet belongs; and send the gateway device the correspondence between the session identifier to which the downlink data packet belongs and the base station device that currently serves the user equipment, so that the gateway device determines a target base station device.

Further, the processor 1301 is further configured to update, in a user location database and according to movement of the user equipment, the correspondence between the session to which the downlink data packet belongs and the base station device that currently serves the user equipment.

As shown in FIG. 13, the network controller further includes: a receiver 1304. The receiver 1304 cooperates with the transmitter 1303 to implement communication between the network controller and another device.

For a working procedure implemented by the network controller provided in this embodiment, refer to the description of the foregoing system embodiment, and details are not described herein again.

The network controller provided in this embodiment needs to be responsible for only a rule of routing from a first edge node to a target edge node, and does not need to adjust the rule of routing from the first edge node to the target edge node in real time due to a location change of user equipment; therefore, a processing burden of the network controller is relatively light, which helps optimize signaling interworking between a control plane and a user plane, and improves communication efficiency of an SDN.

Figure 14:
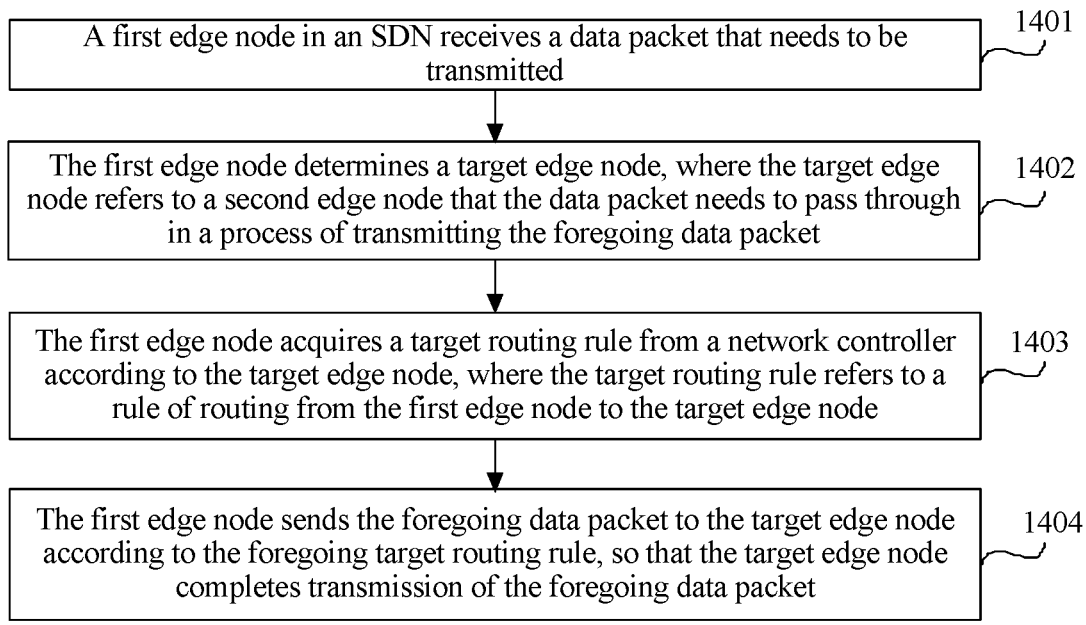
FIG. 14 is a flowchart of a data transmission method according to an embodiment of the present invention.

FIG. 14 is a flowchart of a data transmission method according to an embodiment of the present invention. As shown in FIG. 14, the method includes the following steps:

1401. A first edge node in an SDN receives a data packet that needs to be transmitted.

1402. The first edge node determines a target edge node, where the target edge node refers to a second edge node that the data packet needs to pass through in a process of transmitting the foregoing data packet.

1403. The first edge node acquires a target routing rule from a network controller according to the target edge node, where the target routing rule refers to a rule of routing between the first edge node and the target edge node.

1404. The first edge node sends the foregoing data packet to the target edge node according to the foregoing target routing rule, so that the target edge node completes transmission of the foregoing data packet.

In this embodiment, there may be one or more first edge nodes, or there may be one or more second edge nodes. The target edge node is one of the second edge nodes.

In this embodiment, as a control plane device of the SDN, the network controller is responsible for controlling the SDN, and is mainly configured to determine and store a rule of routing from any first edge node to any second edge node in advance, and provide the required target routing rule for the first edge node.

After receiving the data packet that needs to be transmitted, the first edge node determines, from the second edge node, the target edge node that the data packet needs to pass through in transmission of the data packet, then acquires, from the network controller, the target rule of routing to the target edge node, and sends the data packet to the target edge node by using the routing rule, so that the target edge node completes transmission of the data packet.

In an optional implementation manner, the first edge node may be a gateway device, the second edge node may be a base station device, and the data packet received by the first edge node may be a downlink data packet sent to user equipment.

In an optional implementation manner, the first edge node may be a base station device, the second edge node may be a gateway device, and the data packet received by the first edge node may be an uplink data packet sent by user equipment.

Optionally, the foregoing gateway device may be a PDN-GW, a GGSN, an S-GW, or the like.

In an optional implementation manner, the network controller may send routing information to the first edge node in advance, where the routing information includes a rule of routing between the first edge node and each second edge node in the SDN. Based on this, step 1403 may include: acquiring, by the first edge node, the target routing rule from the routing information that is sent in advance by the network controller.

In another optional implementation manner, the network controller may not send routing information to the first edge node in advance, but may return the target routing rule to the first edge node according to a real-time request of the first edge node. Based on this, step 1403 may include: sending, by the first edge node after receiving the data packet, the network controller a request message for requesting the target routing rule; receiving, by the network controller, the request message sent by the first edge node, and returning the target routing rule to the first edge node according to the request message; and receiving, by the first edge node, the target routing rule sent by the network controller according to the request message. The request message may include an identifier of the target edge node, which is used by the network controller to determine a rule of routing from the first edge node to a second edge node requested by the first edge node.

If the first edge node is a gateway device and the second edge node is a base station device, an implementation manner of step 1402 includes: determining, by the gateway device, a session identifier to which the downlink data packet belongs, and querying a correspondence between a session identifier and a base station device according to the session identifier to which the downlink data packet belongs, to determine a target base station device.

Generally, for a data packet based on a session granularity, some sessions require a QoS assurance and have a feature such as long duration, and this type of session belongs to a long session; some other sessions, for example, a large quantity of sessions generated in a web browsing service, one of current mainstream services, mostly have short duration, and this type of session is a short session. Generally a dedicated bearer needs to be established to carry the long session. In addition, due to the long duration, there is a high probability that the user equipment moves during this period, and therefore, the long session has a high requirement on mobility. The short session does not require establishment of a dedicated bearer and may be carried in a default bearer. In addition, due to the short duration, there is a low probability that the user equipment moves. Even if the user equipment moves, the user equipment re-initiates a service request at a transport layer or an application layer, which exerts little impact on user experience. Therefore, the short session also has a low requirement on mobility.

It can be seen that for the long session, the foregoing correspondence between the session identifier and the base station device may be updated in real time by the network controller according to movement of the user equipment, to ensure the requirement of these long sessions on mobility. For the short session, the network controller may not need to be involved in updating of the correspondence between the session identifier and the base station device, and a burden of the network controller is lessened because a short-session service is processed by the gateway device.

Based on the foregoing description, in a scenario in which the downlink data packet belongs to a short session, the method provided in this embodiment may further include: receiving, by the gateway device before receiving the downlink data packet sent to the user equipment, an uplink data packet corresponding to the downlink data packet, and when identifying that the uplink data packet belongs to a new session that uses a default bearer, locally generating, according to the uplink data packet, a target filtering rule used for the downlink data packet, and generating a correspondence between the session identifier to which the uplink data packet belongs and a base station device that currently serves the user equipment.

Based on the foregoing description, in a scenario in which the downlink data packet belongs to a long session, the method provided in this embodiment may further include: receiving, by the gateway device, a target filtering rule that is sent by the network controller and that is used for the downlink data packet, locally storing the target filtering rule, and receiving a correspondence between the session identifier to which the downlink data packet belongs and a base station device that currently serves the user equipment; where the correspondence is sent by the network controller, and the target filtering rule is generated for the downlink data packet after the network controller learns that the downlink data packet belongs to a new session that uses a dedicated bearer.

In the foregoing two scenarios, an implementation process in which the gateway device determines the session identifier to which the downlink data packet belongs may include: determining, by the gateway device according to the target filtering rule used for the downlink data packet, the session identifier to which the downlink data packet belongs. A difference lies in that in the short-session scenario, the target filtering rule is generated by the gateway device, while in the long-session scenario, the target filtering rule is generated by the network controller and delivered to the gateway device.

Generally, because different sessions are corresponding to different filtering rules, a session identifier to which a data packet belongs may be determined by a filtering rule used for the data packet. Therefore, the gateway device may be specifically configured to perform matching in a locally stored filtering rule according to packet header information of the downlink data packet, acquire the target filtering rule used for the downlink data packet, and determine, according to the target filtering rule, the session identifier to which the downlink data packet belongs. The filtering rule is generally generated according to the packet header information of the data packet. The packet header information of the downlink data packet mainly includes header information of various protocol stacks included in the data packet, such as MAC protocol header information or IP protocol header information. Further, for example, the IP protocol header information includes information such as a source address, a destination address, and a protocol type.

It can be seen that, in the method provided in this embodiment, a first edge node determines, from a second edge node, a target edge node that a data packet needs to pass through in transmission of the data packet, which may adapt to a case in which the target edge node changes due to mobility of user equipment; a network controller is responsible for only a rule of routing between the first edge node and the target edge node, and does not need to adjust the rule of routing from the first edge node to the target edge node in real time due to a location change of the user equipment, which effectively lessens a processing burden of the network controller, optimizes signaling interworking between a control plane and a user plane, and improves communication efficiency of an SDN.

Figure 15:
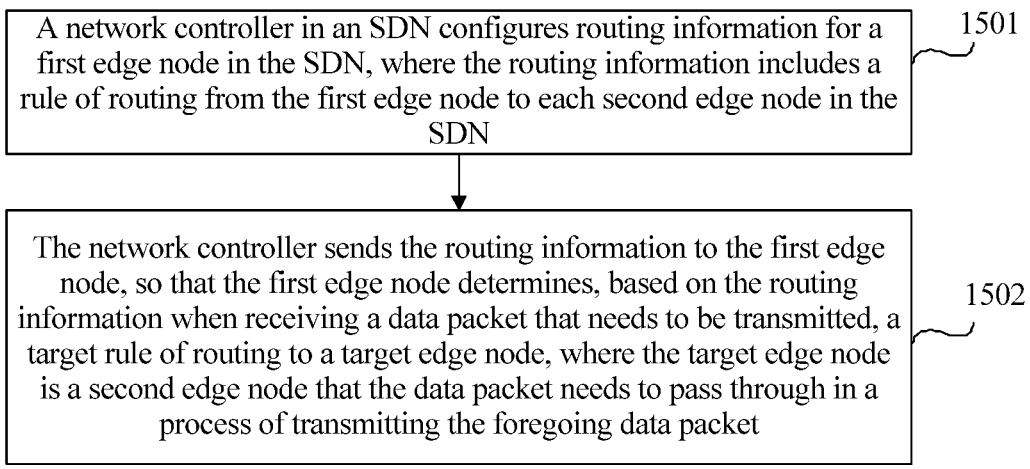
FIG. 15 is a flowchart of a transmission control method according to an embodiment of the present invention.

FIG. 15 is a flowchart of a transmission control method according to an embodiment of the present invention. As shown in FIG. 15, the method includes the following steps:

1501. A network controller in an SDN configures routing information for a first edge node in the SDN, where the routing information includes a rule of routing from the first edge node to each second edge node in the SDN.

1502. The network controller sends the routing information to the first edge node, so that the first edge node determines, based on the routing information when receiving a data packet that needs to be transmitted, a target rule of routing to a target edge node, where the target edge node is a second edge node that the data packet needs to pass through in a process of transmitting the foregoing data packet.

Specifically, in this implementation manner, the network controller determines and saves a rule of routing between any first edge node and any second edge node in advance, and delivers the rule of routing between any first edge node and any second edge node to the first edge node in advance, so that when receiving the data packet that needs to be forwarded and determining the target edge node, the first edge node acquires a target rule of routing between the first edge node and the target edge node, and further sends the data packet to the target edge node based on the target routing rule.

In an optional implementation manner, the first edge node may be a gateway device, the second edge node may be a base station device, and the data packet received by the first edge node may be a downlink data packet sent to user equipment.

In an optional implementation manner, the first edge node may be a base station device, the second edge node may be a gateway device, and the data packet received by the first edge node may be an uplink data packet sent by user equipment.

Optionally, the foregoing gateway device may be a PDN-GW, a GGSN, an S-GW, or the like.

Based on the foregoing base station device and the foregoing gateway device, the network controller determines and saves a rule of routing between any gateway device and any base station device in advance, and delivers the rule of routing between any gateway device and any base station device to the gateway device and the base station device, so that the gateway device acquires, when receiving the data packet that needs to be forwarded and determining a target base station device, a rule of routing between the gateway device and the target base station device, or the base station device acquires, when receiving the data packet that needs to be forwarded and determining a target gateway device, a rule of routing between the base station device and the target gateway device.

Optionally, the network controller may deliver the corresponding routing rule in a form of a routing table to the gateway device and the base station device.

In an optional implementation manner, to further lessen a processing burden of the network controller, the network controller may perform mobility management only on a long session. Specifically, after learning that the downlink data packet received by the gateway device belongs to a new session that uses a dedicated bearer (that is, a long session), the network controller generates a target filtering rule used for the downlink data packet; generates a correspondence between a session identifier to which the downlink data packet belongs and a base station device that currently serves the user equipment; then sends the target filtering rule to the gateway device, so that the gateway device determines, according to the target filtering rule, the session identifier to which the downlink data packet belongs; and sends the gateway device the correspondence between the session identifier to which the downlink data packet belongs and the base station device that currently serves the user equipment, so that the gateway device determines the target base station device. In this implementation manner, the gateway device determines, based on the target filtering rule used for the downlink data packet, the session identifier to which the downlink data packet belongs, queries the correspondence between the session identifier and the base station device based on the session identifier to which the downlink data packet belongs, and determines that the base station device corresponding to the session identifier to which the downlink data packet belongs is the target base station device.

Based on the foregoing description, the network controller may further update, according to movement of the user equipment, the correspondence between the session identifier to which the downlink data packet belongs and the base station device that currently serves the user equipment, to ensure that the target base station device determined by the gateway device is the base station device that currently serves the user equipment, and ensure correct forwarding of the data packet.

In the method provided in this embodiment, a network controller needs to be responsible for only a rule of routing from a first edge node to a target edge node, and does not need to adjust the rule of routing from the first edge node to the target edge node in real time due to a location change of user equipment; therefore, a processing burden of the network controller is relatively light, which helps optimize signaling interworking between a control plane and a user plane, and improves communication efficiency of an SDN.

Figure 16:
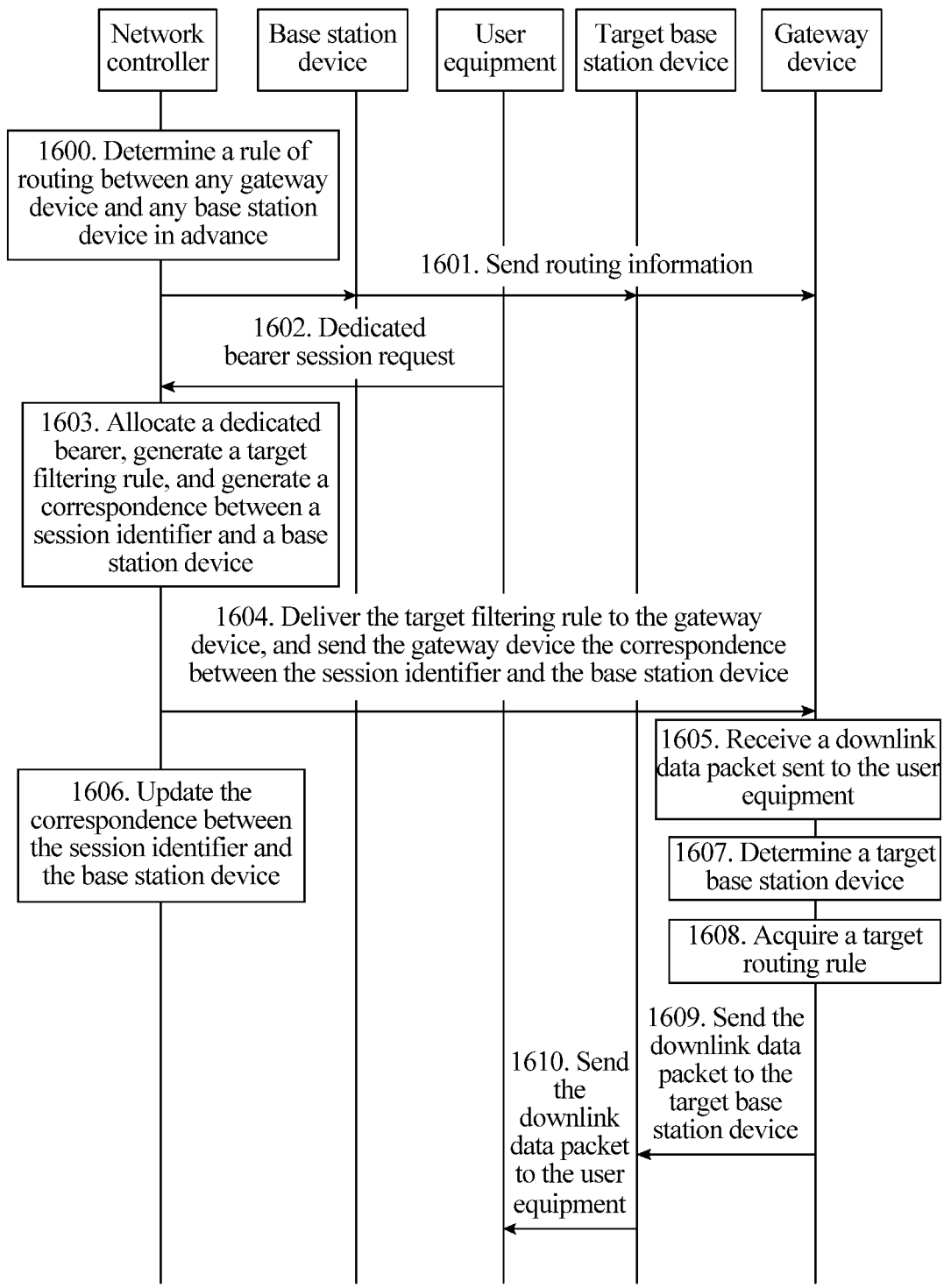
FIG. 16 is a flowchart of another data transmission method according to an embodiment of the present invention.

FIG. 16 is a flowchart of another data transmission method according to an embodiment of the present invention. In this implementation manner, a first edge node is a gateway device, and a second edge node is a base station device. As shown in FIG. 16, the method includes the following steps:

1600. A network controller determines a rule of routing between any gateway device and any base station device in advance.

1601. The network controller separately sends routing information to the gateway device and the base station device, where the routing information sent to the gateway device includes a rule of routing between the gateway device and each base station device, and the routing information sent to the base station device includes a rule of routing between the base station device and each gateway device.

It is noted herein that in addition to sending the routing information to the gateway device and the base station device in advance, the network controller may further return a routing rule to the gateway device and the base station device according to a request message sent by the gateway device or the base station device in real time.

1602. User equipment initiates a dedicated bearer session request to the network controller.

1603. The network controller allocates a dedicated bearer to the user equipment, generates a target filtering rule used for a downlink data packet of the user equipment, and generates a correspondence between a session identifier to which the downlink data packet of the user equipment belongs and a base station device that currently serves the user equipment.

For example, the network controller may determine, according to user information and a current network status, that the dedicated bearer may be allocated to the user equipment.

1604. The network controller delivers, to the gateway device, the target filtering rule used for the downlink data packet of the user equipment, and sends the gateway device the correspondence between the session identifier to which the downlink data packet of the user equipment belongs and the base station device that currently serves the user equipment.

1605. The gateway device receives the downlink data packet sent to the user equipment.

1606. If the user equipment moves during this period, the network controller updates, according to movement of the user equipment, the correspondence between the session identifier to which the downlink data packet of the user equipment belongs and the base station device that currently serves the user equipment.

1607. The gateway device queries the correspondence between the session identifier and the base station device according to the session identifier to which the downlink data packet belongs, to determine that the base station device corresponding to the session identifier to which the downlink data packet belongs is used as a target base station device, where the target base station device refers to a base station device that the downlink data packet needs to pass through in a process of transmitting the foregoing downlink data packet.

In this embodiment, on the assumption that the user equipment moves, the target base station device determined by the gateway device is different from a base station device that previously served the user equipment. The base station device in FIG. 16 refers to an original base station device that served the user equipment before the user equipment moves, and the target base station device in FIG. 16 refers to a base station device that serves the user equipment after the user equipment moves.

1608. The gateway device acquires, according to the target base station device, a target routing rule from routing information that is delivered in advance by the network controller, where the target routing rule refers to a rule of routing from the gateway device to the target base station device.

1609. The gateway device sends the foregoing downlink data packet to the target base station device according to the foregoing target routing rule, so that the target base station device completes transmission of the foregoing downlink data packet.

1610. The target base station device sends the downlink data packet to the user equipment.

The method provided in this embodiment is particularly applicable to, but not limited to, a long-session scenario.

In the method provided in this embodiment, because locations of a base station device and a gateway device in a network topology remain unchanged, the network topology that connects the base station device and the gateway device is also relatively stable. Based on this, a rule of routing between any gateway device and any base station device that is stored by a network controller in an SDN is relatively static, and the rule of routing between the gateway device and the base station device does not need to be adjusted in real time due to a location change of a user, which effectively lessens a processing burden of the network controller. In addition, the network controller does not need to frequently provide the routing rule for the gateway device or the base station device, which helps reduce signaling interworking between a control plane device (that is, the network controller) and a user plane device (that is, the gateway device or the base station device), and further helps improve communication efficiency of the entire SDN. In addition, location information of user equipment in the SDN may be dynamic, and in a process of forwarding the data packet, because the network controller updates a correspondence between an identifier of a session initiated by the user equipment and a base station device currently serving the user equipment, the gateway device performs routing by using information about a current location of the user equipment (a base station device currently serving the user equipment), which effectively ensures data transmission in a moving process of the user.

Figure 17A:
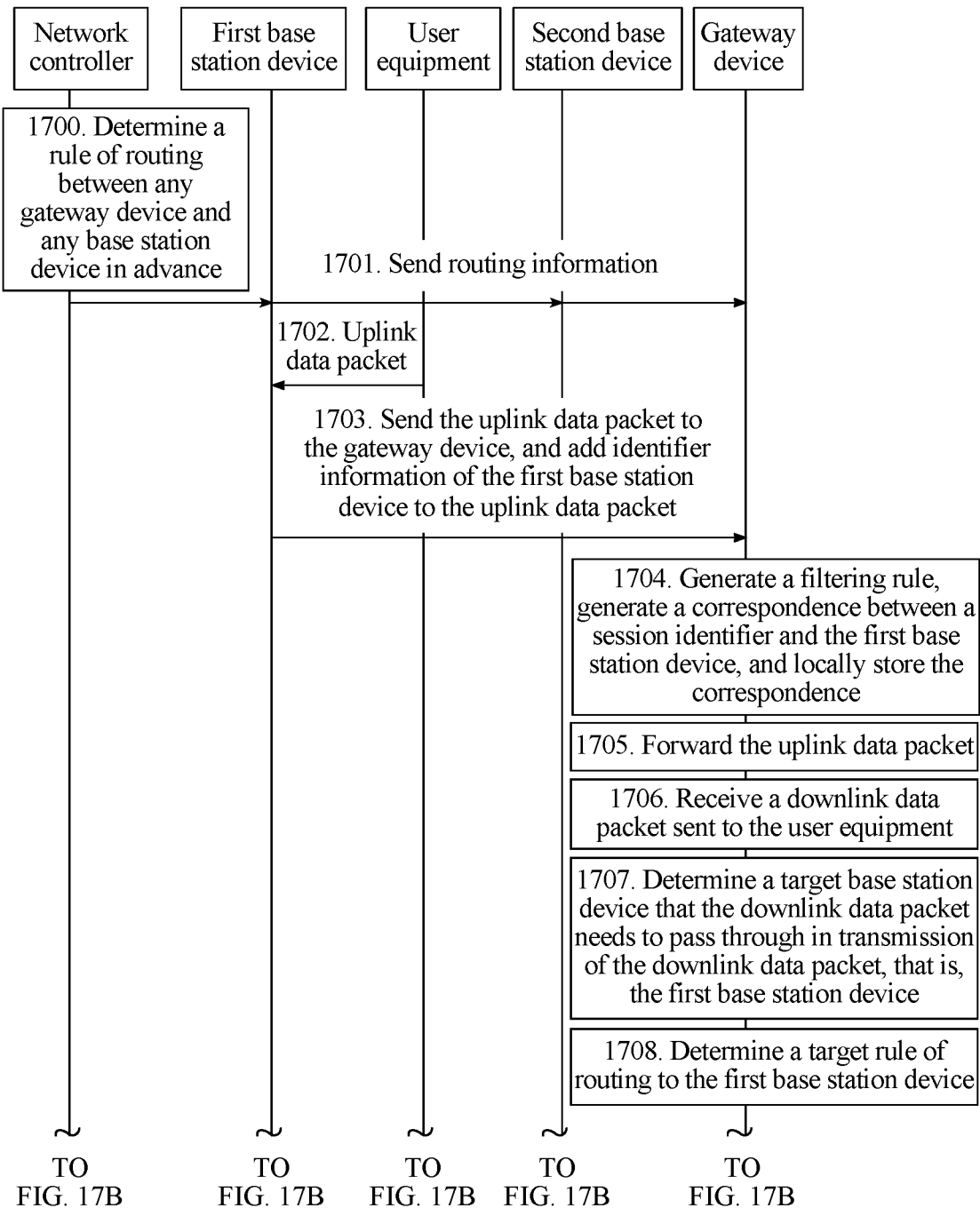
FIG. 17A and FIG. 17B are a flowchart of still another data transmission method according to an embodiment of the present invention.
Figure 17B:
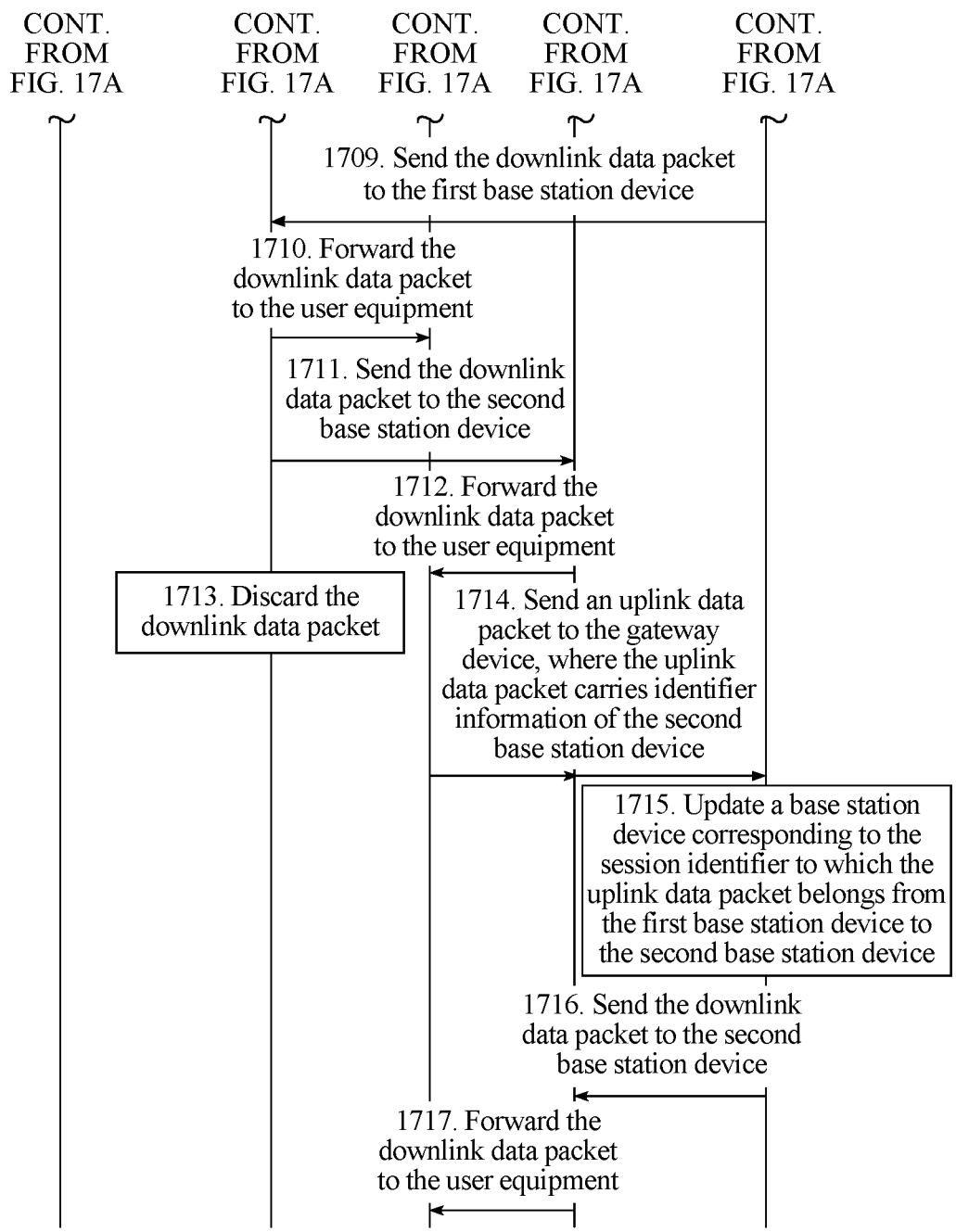

FIG. 17A and FIG. 17B are a flowchart of still another data transmission method according to an embodiment of the present invention. In this implementation manner, a first edge node is a gateway device, and a second edge node is a base station device. As shown in FIG. 17A and FIG. 17B, the method includes the following steps:

1700. A network controller determines a rule of routing between any gateway device and any base station device in advance.

1701. The network controller separately sends routing information to the gateway device and the base station device, where the routing information sent to the gateway device includes a rule of routing between the gateway device and each base station device, and the routing information sent to the base station device includes a rule of routing between the base station device and each gateway device.

It is noted herein that in addition to sending the routing information to the gateway device and the base station device in advance, the network controller may further return a routing rule to the gateway device and the base station device according to a request message sent by the gateway device or the base station device in real time.

1702. A first base station device receives an uplink data packet sent by user equipment to the gateway device, where the uplink data packet herein may be, but is not limited to, a service request.

1703. The first base station device determines, according to the routing information that is sent in advance by the network controller, a target rule of routing to the gateway device, sends the uplink data packet to the gateway device according to the target routing rule, and adds identifier information of the first base station device to the uplink data packet.

1704. If the gateway device identifies, after receiving the uplink data packet, that the uplink data packet belongs to a new session that uses a default bearer, the gateway device locally generates a filtering rule used for a downlink data packet corresponding to the uplink data packet, generates a correspondence between a session identifier to which the uplink data packet belongs and the first base station device according to the identifier information of the first base station device that is carried in the uplink data packet, and locally stores the correspondence.

1705. The gateway device forwards the uplink data packet.

1706. The gateway device receives the downlink data packet sent to the user equipment.

1707. The gateway device queries the previously stored correspondence between the session identifier to which the uplink data packet belongs and the first base station device according to a session identifier to which the downlink data packet belongs, to determine a target base station device that the downlink data packet needs to pass through in transmission of the downlink data packet, that is, the first base station device.

1708. The gateway device determines, according to the routing information that is delivered in advance by the network controller, a target rule of routing to the first base station device.

1709. The gateway device sends the downlink data packet to the first base station device according to the determined target rule of routing to the first base station device.

Optionally, if the user equipment does not move in this process, step 1710 may be executed after step 1709; if the user equipment moves in this process, for example, the user equipment moves from the first base station device to a second base station device, steps 1711 and 1712 may be executed, or step 1713 to step 1717 may be executed.

1710. The first base station device forwards the downlink data packet to the user equipment.

1711. The first base station device forwards the downlink data packet to a second base station device, so that the second base station device forwards the downlink data packet to the user equipment.

1712. The second base station device sends the downlink data packet to the user equipment.

1713. The first base station device discards the downlink data packet.

1714. The user equipment resends an uplink data packet to the gateway device by using the second base station device, where the uplink data packet may be a service request, and the uplink data packet carries identifier information of the second base station device.

1715. If the gateway device identifies, after receiving the uplink data packet sent by the second base station device, that the uplink data packet belongs to the existing session, but a base station device corresponding to the session identifier to which the uplink data packet belongs changes, the gateway device updates the base station corresponding to the session identifier to which the uplink data packet belongs from the first base station device to the second base station device.

1716. The gateway device sends the downlink data packet to the second base station device according to an updated correspondence between the session identifier and the base station device.

1717. The second base station device sends the downlink data packet to the user equipment.

The method provided in this embodiment is particularly applicable to, but not limited to, a short-session scenario.

In the method provided in this embodiment, because locations of a base station device and a gateway device in a network topology remain unchanged, the network topology that connects the base station device and the gateway device is also relatively stable. Based on this, a rule of routing between any gateway device and any base station device that is stored by a network controller in an SDN is relatively static, and the rule of routing between the gateway device and the base station device does not need to be adjusted in real time due to a location change of a user, which effectively lessens a processing burden of the network controller. In addition, the network controller does not need to frequently provide the routing rule for the gateway device or the base station device, which helps reduce signaling interworking between a control plane device (that is, the network controller) and a user plane device (that is, the gateway device or the base station device), and further helps improve communication efficiency of the entire SDN. In addition, the network controller in the SDN does not need to update a correspondence between an identifier of a session initiated by user equipment and a base station device currently serving the user equipment, which may further lessen the processing burden of the network controller.

A person of ordinary skill in the art may understand that all or some of the steps of the method embodiments may be implemented by a program instructing related hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A software-defined network (SDN) comprising:
a network controller;
a first edge node, wherein the first edge node is configured to:
   receive a data packet that is to be transmitted,
   adapt to changes due to mobility of a user equipment by determining a target edge node without the network controller adjusting a rule of routing from the first edge node to the target edge node in real time,
   acquire a target routing rule from the network controller according to the target edge node, and send the data packet to the target edge node according to the target routing rule, so that the target edge node completes transmission of the data packet;
a plurality of additional edge nodes comprising a second edge node, wherein the target edge node is determined by the first edge node from the second edge node, wherein the target edge node is an additional edge node of the plurality of additional edge nodes, and wherein the data packet passes through the additional edge node in a process of transmitting the data packet, and the target routing rule refers to the rule of routing from the first edge node to the target edge node, wherein the additional edge node is configured to receive the data packet sent by the first edge node according to the target routing rule and complete transmission of the data packet while being used as the target edge node; and
wherein the network controller is configured to provide the target routing rule for the first edge node.

2. The SDN according to claim 1, wherein that the first edge node is configured to acquire a target routing rule from the network controller according to the target edge node comprises:
the first edge node is configured to acquire the target routing rule from routing information that is sent in advance by the network controller, wherein the routing information comprises additional rules of routing between the first edge node and each of the plurality of additional edge nodes in the SDN; and
the network controller is configured to send the routing information to the first edge node in advance.

3. The SDN according to claim 1, wherein that the first edge node is configured to acquire a target routing rule from the network controller according to the target edge node comprises:
the first edge node is configured to: after receiving the data packet, send the network controller a request message for requesting the target routing rule, and receive the target routing rule sent by the network controller according to the request message; and
the network controller is configured to: receive the request message, and return the target routing rule to the first edge node according to the request message.

4. The SDN according to claim 1, wherein the first edge node is a gateway device, the data packet is a downlink data packet sent to user equipment, and the second edge node is a base station device;
wherein that the first edge node is configured to determine a target edge node comprises:
the gateway device is configured to: determine a session identifier to which the downlink data packet belongs, and query a correspondence between a session identifier and a base station device according to the session identifier to which the downlink data packet belongs, to determine a target base station device.

5. A network device comprising:
a receiver to receive a data packet that needs to be transmitted;
a processor;
a memory storing a program to be executed in the processor, the program comprising instructions for:
adapting to changes due to mobility of a user equipment by determining a target edge node without a network controller adjusting a rule of routing from a first edge node to the target edge node in real time, wherein the network device is located in a software-defined network (SDN), wherein the network device is the first edge node, wherein a second edge node that is in the SDN is used as the target edge node, and wherein the data packet needs to pass through the second edge node in a process of transmitting the data packet;
acquiring a target routing rule from the network controller in the SDN according to the target edge node, wherein the target routing rule refers to the rule of routing from the first edge node to the target edge node;
generating the data packet according to the target routing rule; and
a transmitter to send the data packet to the target edge node so that the target edge node completes transmission of the data packet.

6. The network device according to claim 5, wherein the acquiring comprises acquiring the target routing rule from routing information that is sent in advance by the network controller, wherein the routing information comprises additional rules of routing between the first edge node and each second edge node in the SDN.

7. The network device according to claim 5, wherein the acquiring further comprises:
after receiving the data packet, sending the network controller a request message for requesting the target routing rule, and
receiving the target routing rule sent by the network controller in response to the request message.

8. A network controller comprising:
a processor;
a memory storing a program to be executed in the processor, the program comprising instructions for:
configuring routing information for a first edge node in a software-defined network (SDN), wherein the network controller is located in the SDN, and wherein the routing information comprises a plurality of rules of routing from the first edge node to each second edge node in the SDN; and
a transmitter to send the routing information to the first edge node, so that the first edge node determines, based on the routing information while receiving a data packet that needs to be transmitted, a target rule of routing to a target edge node, wherein a second edge node in the SDN is used as the target edge node, wherein the data packet passes through the second edge node in a process of transmitting the data packet, and wherein the first edge node adapts, while receiving the data packet, to changes due to mobility of a user equipment by determining the target edge node without the network controller adjusting a rule of routing of the plurality of rules of routing from the first edge node to the target edge node in real time.

9. The network controller according to claim 8, wherein the program further comprises instructions for:
after learning that a downlink data packet belongs to a new session that uses a dedicated bearer, generating a target filtering rule used for the downlink data packet, and generating a correspondence between a session identifier to which the downlink data packet belongs and a base station device that currently serves a user equipment;
wherein the transmitter is further configured to: send the target filtering rule to a gateway device, so that the gateway device determines, according to the target filtering rule, the session identifier to which the downlink data packet belongs; and send the gateway device the correspondence between the session identifier to which the downlink data packet belongs and the base station device that currently serves the user equipment, so that the gateway device determines a target base station device.

10. The network controller according to claim 8, the program further comprises instructions for:
  updating, according to movement of a user equipment, the correspondence between a session identifier to which a downlink data packet belongs and a base station device that currently serves the user equipment.

11. A data transmission method comprising:
  receiving, by a first edge node in a software-defined network (SDN), a data packet that is to be transmitted;
  adapting to changes due to mobility of a user equipment by determining, by the first edge node, a target edge node without a network controller adjusting a rule of routing from the first edge node to the target edge node in real time, wherein a second edge node is used as the target edge node, and wherein the data packet passes through the second edge node in a process of transmitting the data packet;
  acquiring, by the first edge node, a target routing rule from the network controller according to the target edge node, wherein the target routing rule refers to the rule of routing from the first edge node to the target edge node; and
  sending, by the first edge node, the data packet to the target edge node according to the target routing rule, so that the target edge node completes transmission of the data packet.

12. The method according to claim 11, wherein the acquiring by the first edge node comprises:
  acquiring, by the first edge node, the target routing rule from routing information that is sent in advance by the network controller, wherein the routing information comprises additional rules of routing between the first edge node and each second edge node in the SDN.

13. The method according to claim 11, wherein the acquiring by the first edge node comprises:
  sending, by the first edge node after receiving the data packet, the network controller a request message for requesting the target routing rule, and receiving, by the first edge node, the target routing rule sent by the network controller according to the request message.

14. A transmission control method comprising:
  configuring, by a network controller in a software-defined network (SDN), routing information for a first edge node in the SDN, wherein the routing information comprises a plurality of rules of routing from the first edge node to each second edge node in the SDN; and
  sending, by the network controller, the routing information to the first edge node, wherein the first edge node determines, based on the routing information while receiving a data packet that is to be transmitted, a target rule of routing to a target edge node, wherein a second edge node in the SDN is used as the target edge node, wherein the data packet passes through the second edge node in a process of transmitting the data packet, and wherein the first edge node adapts, while receiving the data packet, to changes due to mobility of a user equipment by determining the target edge node without the network controller adjusting a rule of routing of the plurality of rules of routing from the first edge node to the target edge node in real time.

15. The method according to claim 14, wherein the first edge node is a gateway device, the data packet is a downlink data packet sent to user equipment, and the second edge node is a base station device, the method further comprising:
  generating, by the network controller after learning that the downlink data packet belongs to a new session that uses a dedicated bearer, a target filtering rule used for the downlink data packet, and generating a correspondence between a session identifier to which the downlink data packet belongs and a base station device that currently serves the user equipment; and
  sending, by the network controller, the target filtering rule to the gateway device, so that the gateway device determines, according to the target filtering rule, the session identifier to which the downlink data packet belongs; and sending the gateway device the correspondence between the session identifier to which the downlink data packet belongs and the base station device that currently serves the user equipment, so that the gateway device determines a target base station device.

16. The SDN according to claim 1, further comprising:
  a user location database, wherein the first edge node determines the target edge node by performing a query in the user location database.

17. The network device according to claim 5, wherein the program further comprises instructions for:
  after receiving the data packet, sending the network controller a request message for requesting the target routing rule; and
  receiving the target routing rule sent by the network controller according to the request message.

18. The network device according to claim 5, wherein determining the target edge node comprises querying a user location database.

19. The method according to claim 11, wherein determining the target edge node comprises querying a user location database.

20. The method according to claim 14, further comprising:
  receiving, by the network controller, a request message from the first edge node; and
  returning, by the network controller, the target routing rule to the first edge node according to the request message.

* * * * *